(12) United States Patent
Miura et al.

(10) Patent No.: US 9,391,369 B2
(45) Date of Patent: Jul. 12, 2016

(54) ANTENNA DEVICE AND COMMUNICATION TERMINAL APPARATUS

(71) Applicant: MURATA MANUFACTURING CO., LTD., Nagaokakyo-Shi, Kyoto-fu (JP)

(72) Inventors: Teppei Miura, Nagaokakyo (JP); Jun Sasaki, Nagaokakyo (JP); Hiroyuki Kubo, Nagaokakyo (JP); Katsumi Taniguchi, Nagaokakyo (JP); Noboru Kato, Nagaokakyo (JP); Masahiro Ozawa, Nagaokakyo (JP); Satoshi Ishino, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 146 days.

(21) Appl. No.: 13/729,377

(22) Filed: Dec. 28, 2012

(65) Prior Publication Data

US 2013/0181876 A1     Jul. 18, 2013

Related U.S. Application Data

(63) Continuation of application No. PCT/JP2011/070099, filed on Sep. 5, 2011.

(30) Foreign Application Priority Data

Sep. 7, 2010  (JP) ................... 2010-200237
Sep. 8, 2010  (JP) ................... 2010-200966
Jan. 21, 2011 (JP) ................... 2011-010459

(51) Int. Cl.
*H01Q 7/06*     (2006.01)
*H01Q 7/08*     (2006.01)
(Continued)

(52) U.S. Cl.
CPC ............. *H01Q 7/00* (2013.01); *G06K 7/10316* (2013.01); *G06K 7/10336* (2013.01);
(Continued)

(58) Field of Classification Search
CPC ..... H01Q 7/06; H01Q 1/2216; H01Q 9/0457; H01Q 7/08; H01Q 1/2225; G06K 17/00
USPC ..................... 343/895, 700 MS, 788, 867
See application file for complete search history.

(56) References Cited

U.S. PATENT DOCUMENTS 5,973,651 A * 10/1999 Suesada .............. H01Q 1/38
                                                343/702
8,354,971 B2    1/2013 Ito et al.
(Continued)

FOREIGN PATENT DOCUMENTS

CN    101479886 A    7/2009
CN    101578736 A   11/2009
(Continued)

OTHER PUBLICATIONS

PCT/JP2011/070099 Written Opinion dated Nov. 25, 2011.
(Continued)

*Primary Examiner* — Dameon E Levi
*Assistant Examiner* — Ricardo Magallanes
(74) *Attorney, Agent, or Firm* — Arent Fox LLP

(57) ABSTRACT

An antenna device that includes coil antennas each having a coil conductor wound around a winding axis and a planar conductor including a surface and an edge end portion, the surface extending along the winding axis of the coil conductor, the edge end portion being adjacent to a coil opening of the coil conductor. A current flowing through the coil conductor induces a current in the planar conductor, this current produces a magnetic flux in a direction normal to the planar conductor, and thus the planar conductor acts as a booster antenna. The antenna device has directivity in the direction normal to the planar conductor because the magnetic flux produced by the coil antennas and that produced by the planar conductor are combined. This enables the antenna device to occupy a small area while achieving a predetermined communication distance.

13 Claims, 25 Drawing Sheets

(51) Int. Cl.
- *H01Q 21/00* (2006.01)
- *H01Q 7/00* (2006.01)
- *G06K 7/10* (2006.01)
- *H01Q 1/22* (2006.01)
- *H01Q 1/24* (2006.01)
- *H01Q 1/38* (2006.01)
- *H01Q 21/29* (2006.01)
- *H01Q 25/00* (2006.01)

(52) U.S. Cl.
CPC ............ *H01Q 1/2216* (2013.01); *H01Q 1/242* (2013.01); *H01Q 1/38* (2013.01); *H01Q 7/06* (2013.01); *H01Q 7/08* (2013.01); *H01Q 21/293* (2013.01); *H01Q 25/00* (2013.01)

(56) References Cited

U.S. PATENT DOCUMENTS

| | | | |
|---|---|---|---|
| 2003/0057288 A1 | 3/2003 | Salzgeber | |
| 2003/0210206 A1* | 11/2003 | Phillips et al. | 343/895 |
| 2004/0108967 A1* | 6/2004 | Fujimura et al. | 343/895 |
| 2006/0114159 A1* | 6/2006 | Yoshikawa et al. | 343/702 |
| 2007/0051807 A1* | 3/2007 | Yamaguchi | 235/451 |
| 2007/0095913 A1* | 5/2007 | Takahashi et al. | 235/451 |
| 2008/0129629 A1* | 6/2008 | Kimura et al. | 343/788 |
| 2009/0021446 A1* | 1/2009 | Kataya et al. | 343/860 |
| 2009/0262041 A1 | 10/2009 | Ikemoto et al. | |
| 2010/0109968 A1* | 5/2010 | Suzuki et al. | 343/876 |
| 2010/0225542 A1* | 9/2010 | Suzuki et al. | 343/700 MS |
| 2011/0031320 A1* | 2/2011 | Kato et al. | 235/492 |
| 2011/0050531 A1* | 3/2011 | Yamaguchi et al. | 343/842 |
| 2011/0227799 A1 | 9/2011 | Hashimoto | |
| 2012/0062436 A1* | 3/2012 | Kimura et al. | 343/788 |
| 2012/0262348 A1 | 10/2012 | Kubo et al. | |

FOREIGN PATENT DOCUMENTS

| | | |
|---|---|---|
| JP | 7-021479 | 1/1995 |
| JP | 10-075113 A | 3/1998 |
| JP | 2000-138621 A | 5/2000 |
| JP | 2003-124725 A | 4/2003 |
| JP | H03-503467 T | 3/2004 |
| JP | 2004-364199 A | 12/2004 |
| JP | 2005-317674 A | 11/2005 |
| JP | 2006-080700 A | 3/2006 |
| JP | 2007-019891 A | 1/2007 |
| JP | 2008-042761 A | 2/2008 |
| JP | 2008-172444 A | 7/2008 |
| JP | 2009-021970 A | 1/2009 |
| JP | 2010-103295 | 5/2010 |
| JP | 2010-103295 A | 5/2010 |
| JP | 2010-109674 A | 5/2010 |
| JP | 2010-168893 | 8/2010 |
| JP | 2010-168893 A | 8/2010 |
| JP | 2010-192951 A | 9/2010 |
| JP | 2011-199343 A | 10/2011 |
| JP | 2011-234174 A | 11/2011 |
| JP | 2012-029258 A | 2/2012 |
| WO | WO-2006-046714 A1 | 5/2006 |
| WO | WO-2008090745 A1 | 7/2008 |
| WO | WO-2011/077878 A1 | 6/2011 |

OTHER PUBLICATIONS

Japanese Office dated Apr. 17, 2012 from corresponding Japanese application No. 2012-509410.
International Search Report issued for PCT/JP2011/070099, date of mailing Dec. 6, 2011.
Japanese Office Action issued for counterpart Japanese Application No. 2013-249177, dispatch date Oct. 14, 2014 (English translation attached).

* cited by examiner

WINDING AXIS DIRECTION

WINDING AXIS DIRECTION

WINDING AXIS DIRECTION

ANTENNA DEVICE AND COMMUNICATION TERMINAL APPARATUS

CROSS REFERENCE TO RELATED APPLICATIONS

The present application is a continuation of International application No. PCT/JP2011/070099, filed Sep. 5, 2011, which claims priority to Japanese Patent Application No. 2010-200237, filed Sep. 7, 2010, Japanese Patent Application No. 2010-200966, filed Sep. 8, 2010, and Japanese Patent Application No. 2011-010459, filed Jan. 21, 2011, the entire contents of each of which are incorporated herein by reference.

FIELD OF THE INVENTION

The present invention relates to an antenna device and a communication terminal apparatus and, in particular, to an antenna device and a communication terminal apparatus used in a communication system in the high-frequency (HF) range.

BACKGROUND OF THE INVENTION

A radio frequency identification (RFID) system for exchanging information between a reader/writer and an RFID tag by non-contact communications is known. Each of the reader/writer and the RFID tag includes an antenna device for transmitting and receiving a radio signal. For example, for an HF-range RFID system that uses 13.56 MHz as the communication frequency, the antenna device of an RFID tag and the antenna device of a reader/writer are coupled to each other mainly through an induction field and transmit and receive predetermined information.

In recent years, some communication terminal apparatuses, such as cellular phones, have introduced an RFID system, and the communication terminal apparatuses have been used as a reader/writer and an RFID tag. As a technique for providing a communication terminal apparatus with the RFID function, as described in, for example, Patent Literature 1, a technique for incorporating an antenna module in the communication terminal apparatus is known. The antenna module is one in which a planar coil antenna is disposed on a planar substrate.

PTL 1: Japanese Unexamined Patent Application Publication No. 2004-364199

SUMMARY OF THE INVENTION

In a system that uses the HF range as the communication frequency, the communication distance between the antenna devices depends on a magnetic flux flowing through the coil antennas. That is, to have a certain degree of communication distance between the antenna devices, it is necessary for the coil antennas to have an increased size. The increased size of the coil antenna impedes miniaturization of the communication terminal apparatus.

In light of the above-described circumstances, it is an object of the present invention to provide an antenna device that occupies a small area while achieving a predetermined communication distance and, additionally, to provide a small communication terminal apparatus.

Solution to Problem

An antenna device according to the present invention includes a coil antenna that includes a coil conductor wound around a winding axis and a planar conductor (booster antenna) that includes a surface and an edge end portion, the surface extending along the winding axis, the edge end portion being adjacent (close) to a coil opening of the coil conductor.

A communication terminal apparatus according to the present invention includes an antenna device and a communication circuit connected to the antenna device, the antenna device including a coil antenna that includes a coil conductor wound around a winding axis and a planar conductor (booster antenna) that includes a surface and an edge end portion, the surface extending along the winding axis, the edge end portion being adjacent (close) to a coil opening of the coil conductor.

Because an antenna device of the present invention includes a coil antenna and a planar conductor, the antenna device occupying a small area while ensuring a predetermined communication distance can be achieved and therefore a small communication terminal apparatus can be achieved.

DETAILED DESCRIPTION OF THE PREFERRED EMBODIMENTS

An antenna device and a communication terminal apparatus according to embodiments described below are used in an RFID system in the HF range, such as near field communication (NFC).

First Embodiment

Figure 1A:
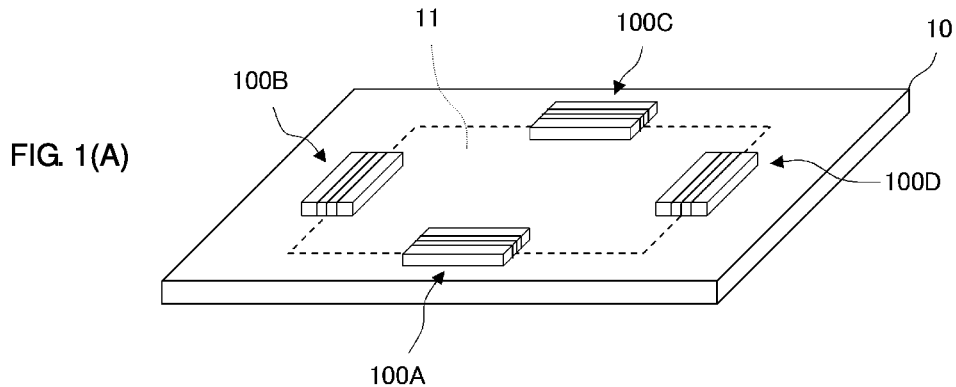
FIG. 1(A) is a perspective view according to an antenna device 201 of a first embodiment and FIG. 1(B) is a plan view thereof.
Figure 1B:
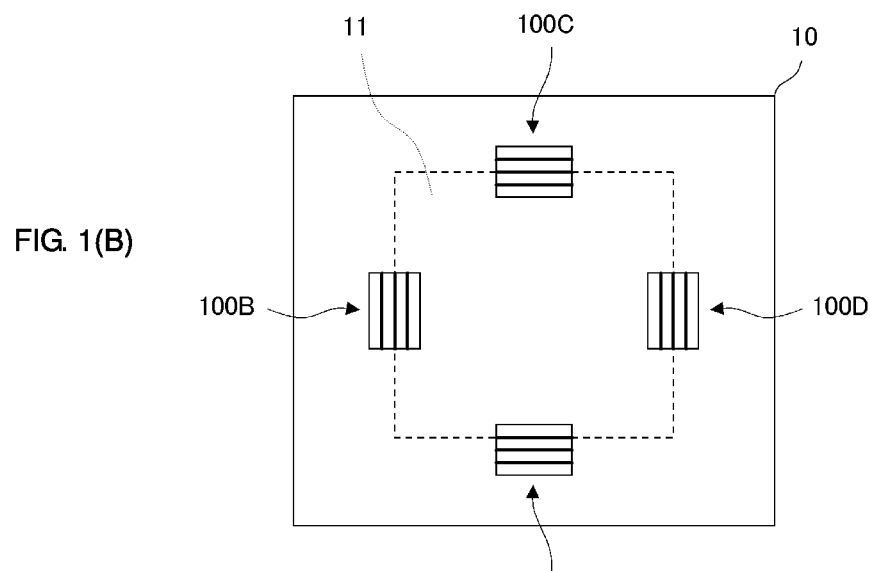

FIG. 1(A) is a perspective view of an antenna device 201 according to a first embodiment and FIG. 1(B) is a plan view thereof.

As illustrated in FIGS. 1(A) and 1(B), the antenna device 201 includes four coil antennas 100A, 100B, 100C, and 100D. Each of the coil antennas 100A, 100B, 100C, and 100D has a structure in which a coil conductor is wound around a magnetic core, as described below.

The antenna device 201 further includes a planar conductor 11 including a surface parallel to the winding axis direction of each of the coil conductors. The planar conductor 11 is disposed on a base 10. The coil antennas 100A, 100B, 100C, and 100D are mounted on the base 10. Each of the coil antennas 100A, 100B, 100C, and 100D is arranged such that a coil opening of the coil conductor is adjacent (close) to the edge end portion of the planar conductor 11.

The planar conductor is made of metallic foil of copper, silver, aluminum, or other metal and is disposed on the base made of flexible resin.

As illustrated in FIGS. 1(A) and 1(B), each of the coil antennas 100A, 100B, 100C, and 100D is arranged such that, when seen from a direction normal to the planar conductor 11, the end portion of the planar conductor 11 and at least a part of the coil conductor overlap each other.

Figure 2:
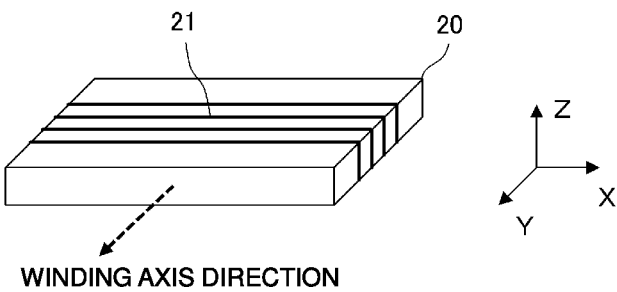
FIG. 2 is a perspective view of a coil antenna for use in the antenna device according to the first embodiment.

FIG. 2 is a perspective view of the coil antenna 100A. The other coil antennas 100B, 100C, and 100D have the same configuration as in the coil antenna 100A, and the coil antenna 100A is described here as a representative.

As illustrated in FIG. 2, the coil antenna 100A has a structure in which a coil conductor 21 made of silver, copper, or other material is wound around a magnetic core 20 made of, for example, ferrite.

As illustrated in FIG. 2, the coil conductor 21 is wound around the outer surface of the magnetic core 20 such that the winding axis extends in a direction parallel to the direction of the short sides of the magnetic core 20 having the shape of a rectangular parallelepiped. That is, the coil conductor 21 is wound along the longitudinal direction (x-axis direction) of the magnetic core 20. The winding axis and the coil openings of the coil conductor 21 extend along the transverse direction (y-axis direction). That is, the coil openings of the coil conductor 21 are disposed on the long sides. The coil antenna 100A is configured as a so-called surface-mount coil antenna (chip coil antenna) and includes two mounting terminal electrodes (not illustrated) on the back side of the coil antenna. One of the two mounting terminal electrodes is connected to a first end of the coil conductor 21, and the other is connected to a second end of the coil conductor 21. That is, the coil antenna 100A is surface-mountable on various substrates, including a printed wiring board.

As illustrated in FIG. 1, each of the coil antennas 100A, 100B, 100C, and 100D is arranged such that the coil opening on a first end face side thereof faces the planar conductor and such that the winding axes of the coil conductors cross above the region where the planar conductor 11 is formed.

The coil antennas are disposed on the respective sides of the planar conductor 11 having the shape of a rectangle. The coil antennas 100A, 100B, 100C, and 100D are arranged so as to surround the planar conductor 11. The surface of the planar conductor is overlaid with an insulating film (not illustrated), and the planar conductor 11 and each of the coil antennas 100A, 100B, 100C, and 100D are not directly connected to each other.

Figure 3:
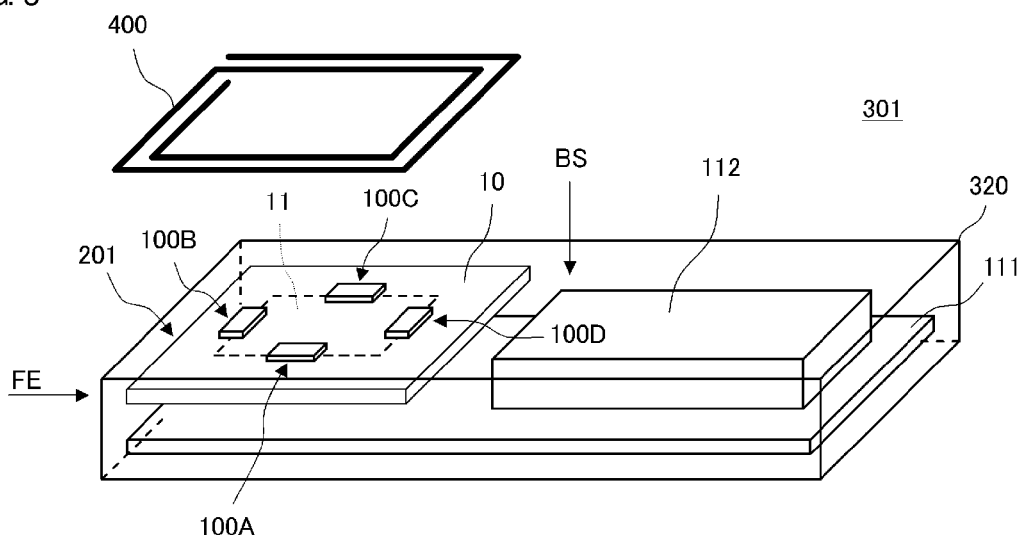
FIG. 3 is a perspective view of a communication terminal apparatus that uses the antenna device according to the first embodiment, the perspective view illustrating an inside portion of the communication terminal apparatus in use.

The antenna device 201 can be arranged in a communication terminal apparatus 301, such as a cellular phone, as illustrated in FIG. 3, for example. That is, in the communication terminal apparatus 301, a main substrate 111 and the base 10 as a sub substrate are incorporated in a terminal housing 320, and the antenna device 201 is configured at the surface of the base 10. The antenna device 201 and a battery pack 112 are arranged in the vicinity of the back surface BS of the terminal housing 320. The main substrate 111 is a large printed wiring board including a hard resin substrate made of, for example, epoxy resin. Circuit elements forming a driving circuit of a display device, a control circuit of the battery, and other circuit are mounted on the main substrate 111. The base 10 as the sub substrate includes a flexible resin substrate made of a polyimide, a liquid crystal polymer, or other resin. In addition to the antenna device 201, circuit elements forming a communication circuit (RF circuit) and other circuit are mounted on the base 10. When the communication terminal apparatus 301 is held over a coil antenna 400 at the other end in communication, as illustrated in FIG. 3, the antenna device 201 and the coil antenna 400 at the other end in communication are coupled mainly through an induction field and predetermined information is transmitted and received.

Figure 4:
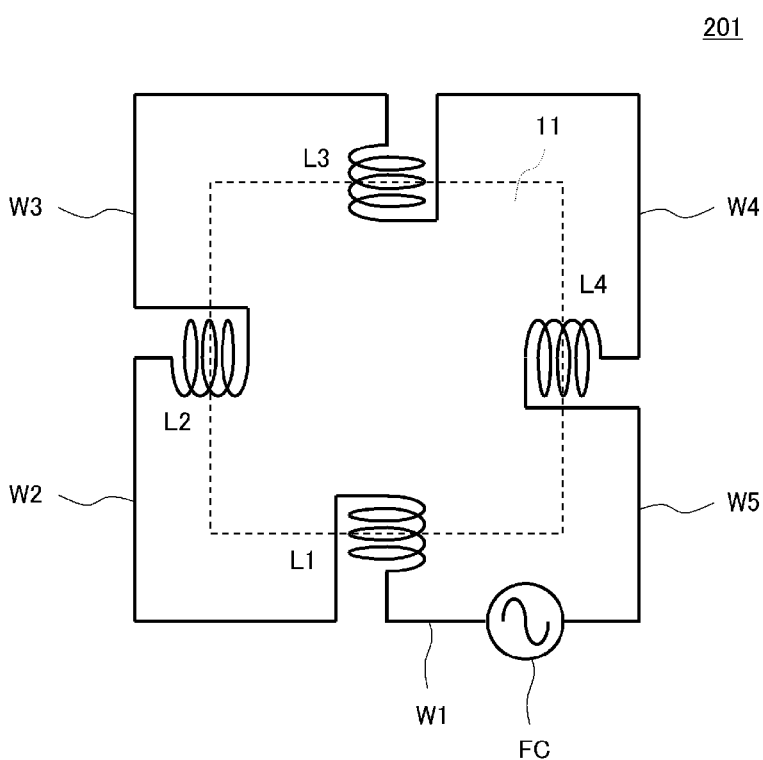
FIG. 4 illustrates a relation between the winding axis directions of coil conductors of the coil antennas and a planar conductor 11.

FIG. 4 illustrates a relation between the winding axis direction of the coil conductor of each of the coil antennas and the planar conductor 11. The coil conductors of the coil antennas are denoted as coils L1 to L4 here. As illustrated in FIG. 4, in the antenna device 201 according to the present embodiment, the coils L1 to L4 are connected in series and connected to a feed circuit FC. It is preferable that connection wiring W1 between the feed circuit FC and the coil L1, connection wiring W2 to W4 between the coils L1 to L4, connection wiring W5 between the coil L4 and the feed circuit FC be arranged outside the area formed by an imaginary straight line that connects the center positions of the coil antennas together because the usable area in the planar conductor 11 is wide. In this respect, it is preferable that the connection wiring W1 to W5 be arranged outside the planar conductor 11. The feed circuit FC can be a radio-frequency integrated circuit (RFIC) including a communication circuit and tag information, for example.

Figure 5A:
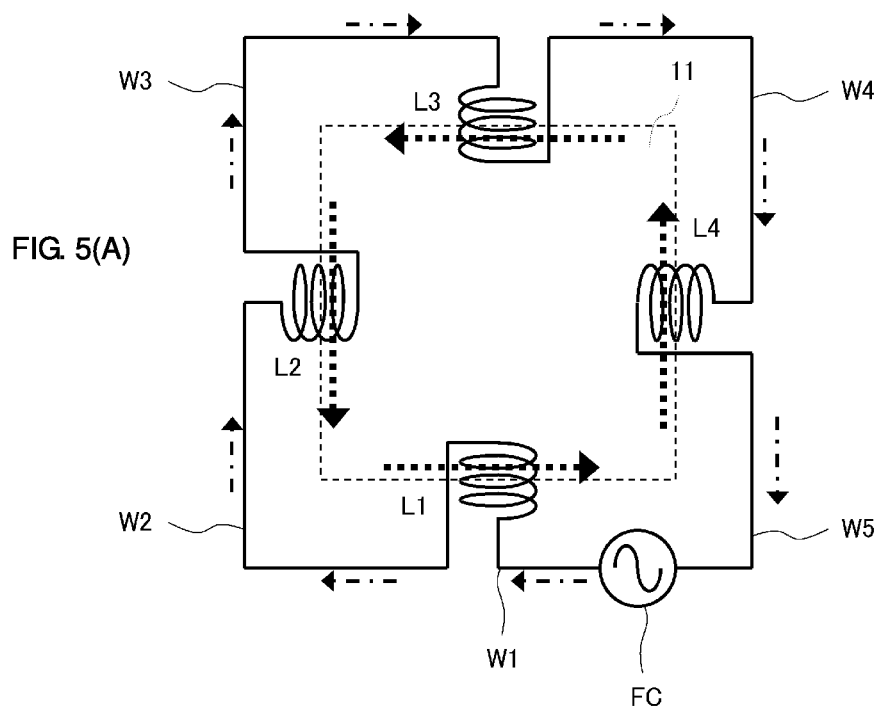
FIG. 5(A) illustrates a relation between currents that flow through coils L1 to L4 and a current that flows through the planar conductor 11 and FIG. 5(B) illustrates a linkage state to coil antennas 100A, 100B, 100C, and 100D.
Figure 5B:
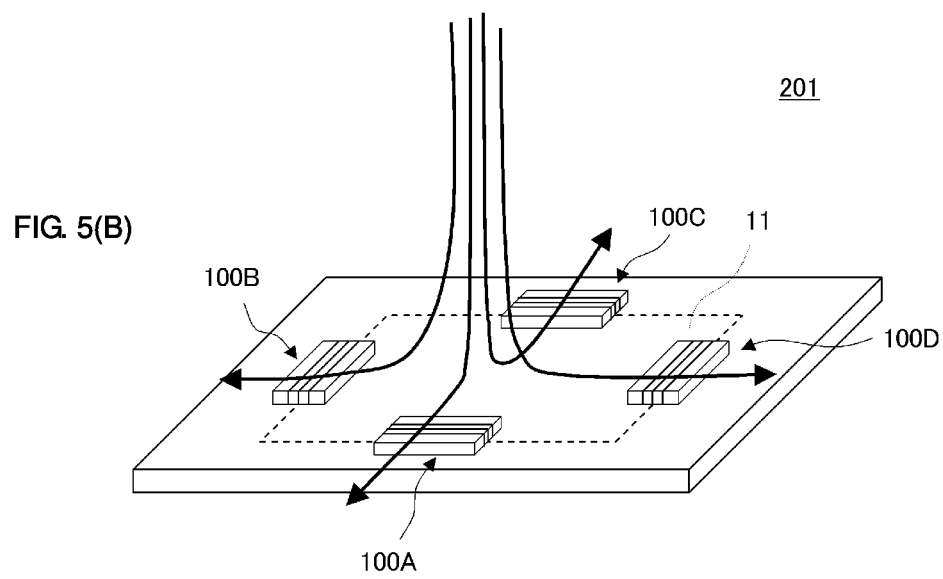

FIG. 5(A) illustrates a relation between currents that flow through the coils L1 to L4 and a current that flows through the planar conductor 11, and FIG. 5(B) illustrates a linkage state to the coil antennas 100A, 100B, 100C, and 100D.

When the planar conductor 11 in the antenna device 201 according to the present embodiment receives a magnetic field from an antenna device at the other end in communication, as illustrated in FIG. 5(A), an eddy current (induced current) occurs in the planar conductor 11. The eddy current also flows in the vicinity of the end edge portion of the planar conductor 11, as indicated by the arrows (of dotted lines) in FIG. 5(A). The magnetic field produced by that current causes a current in a direction opposite to the direction of the current flowing through the end edge portion of the planar conductor 11 to flow through a portion of each of the coils L1 to L4, the portion being close to the edge end portion of the planar conductor 11. As a result, currents indicated by the arrows (of dot-and-dash lines) in FIG. 5(A) also flow through the connection wiring W1 to W5.

Of a magnetic field from the antenna device at the other end in communication, a magnetic flux (indicated by the solid lines in FIG. 5(B)) other than the component from which the eddy current occurs in the planar conductor 11 passes through each of the coil antennas 100A, 100B, 100C, and 100D, which are arranged on the edge end portion of the planar conductor 11, as illustrated in FIG. 5(B). That is, the magnetic flux entering each of the coils L1 to L4 illustrated in FIG. 5(A) induces a current in the coil conductor, and as a result, the currents flow, as indicated by the arrows (of dot-and-dash lines) in FIG. 5(A). When a current is supplied from the feed circuit FC, a phenomenon opposite to the above occurs. In this manner, the planar conductor 11 acts as a booster antenna.

As described above, according to the present embodiment, the use of a plurality of coil antennas, in particular, a plurality of surface-mount coil antennas, in addition, the use of a magnetic field coupling between the planar conductor and the coil antennas enables an antenna device having electric characteristics substantially equivalent to or better than those of a large coil antenna and can reduce the area occupied by the coil antennas without the use of a large coil antenna. As a result, the communication terminal apparatus can be miniaturized.

In the foregoing, an example in which the winding axis direction of the coil conductor of each coil antenna is parallel to the surface of the planar conductor is illustrated. Being parallel does not necessarily require being strictly parallel and only requires that the surface of the planar conductor extend along the winding axis of the coil conductor. In other words, it is only required that the coil antenna be arranged such that the winding axis of the coil conductor extends along the planar conductor. For example, when the winding axis direction of the coil conductor is in the range from −45° to +45° with respect to a direction normal to the planar conductor 11, this is considered to be the state of extending "along" in the present invention. The same applies to other embodiments described below.

It is only required that the coil conductor 21 of each coil antenna be close to the end portion of the planar conductor 11. It is preferable that, when seen from a direction normal to the planar conductor 11, the end portion of the planar conductor 11 and at least a part of the coil conductor 21 overlap each other, as described above because a current flowing through the end portion of the planar conductor 11 can be more easily induced to the coil conductor 21. From the same reason, it is preferable that a portion in the coil conductor 21, the portion being closest to the end portion of the planar conductor 11, extend in a direction parallel to the end portion of the planar conductor 11. It is preferable that the end portion of the planar conductor 11 and at least a part of the magnetic core 20 overlap each other because a conductive portion of the coil conductor 21 in the vicinity of the bottom side of the magnetic core 20 and the planar conductor 11 are coupled, whereas a conductive portion in the vicinity of the top side of the magnetic core 20 is not easily coupled to the planar conductor 11, and the occurrence of currents cancelling out each other can be prevented.

It is preferable that each coil antenna be arranged such that the winding axes of the coil conductors 21 are parallel (coaxial) to each other because the component of a magnetic flux in the winding axis direction is cancelled and directivity of the antenna device in a direction normal to the planar conductor 11 is obtained.

It is preferable that each coil antenna be arranged such that the winding axes of the coil conductors 21 of the coil antennas cross above the region where the planar conductor 11 is formed because a magnetic flux heading for that intersection can sufficiently flow through each coil antenna.

It is preferable that the magnetic core 20 in each of the coil antennas have the shape of a rectangular parallelepiped and that the coil conductor 21 be wound so as to have the winding axis being parallel to the short sides of the magnetic core 20, that is, the coil conductor 21 be wound such that the coil openings are disposed on the long side of the magnetic core 20. This is because a current flowing through the planar conductor 11 can be more easily guided to the coil conductor 21 and a magnetic flux flowing in a direction parallel to the planar conductor 11 can more easily flow through the coil antenna without an increase in the area for disposing the coil antenna.

Additionally, it is preferable that, when seen from a direction normal to the planar conductor 11, the coil conductor 21 be arranged so as to include a first portion where it overlaps the end portion of the planar conductor 11 and a second portion where it does not overlap the planar conductor 11. This is because the frequency characteristic does not tend to vary if the coil antenna is misaligned at the time of placement and also because an eddy current flowing through the planar conductor 11 is large in the vicinity of the edge end portion of the planar conductor 11 and thus the degree of coupling (magnetic coupling) between the planar conductor 11 and the coil conductor 21 can be large, and as a result, an antenna device with a reduced loss can be achieved.

Second Embodiment

Figure 6:
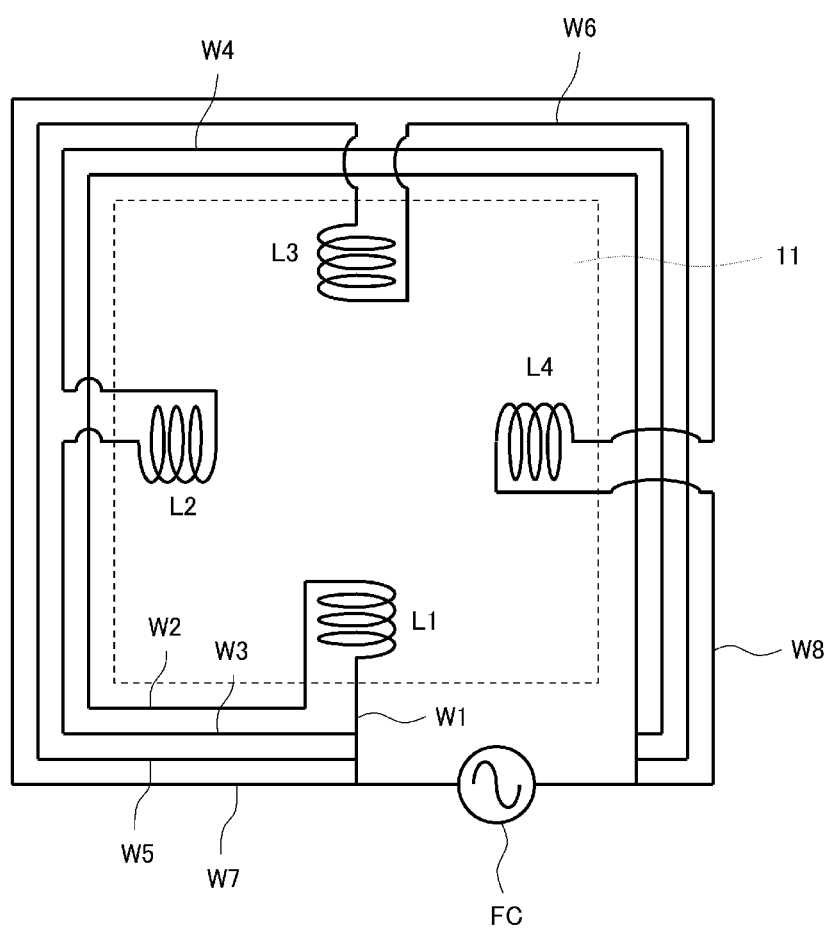
FIG. 6 illustrates a connection relation between coil antennas of an antenna device 202 according to a second embodiment and a connection relation with a feed circuit.

FIG. 6 illustrates a connection relation between the coil antennas of an antenna device 202 according to a second embodiment and a connection relation with a feed circuit. The coil conductors of the coil antennas are denoted as the coils L1 to L4 here. The configuration of each coil antenna is substantially the same as in the first embodiment.

As illustrated in FIG. 6, in the antenna device 202 according to the present embodiment, each of the coils L1 to L4 is connected to the feed circuit FC. That is, the coil conductors of the coil antennas are connected to the feed circuit FC such that they are in parallel to each other. More specifically, a first input/output port of the feed circuit FC is connected to a first end of the coil L1 through wiring W1, and a second end of the coil L1 is connected to a second input/output port of the feed circuit FC through wiring W2. Similarly, the first input/output port of the feed circuit FC is connected to a first end of the coil L2 through wiring W3, and a second end of the coil L2 is connected to the second input/output port of the feed circuit FC through wiring W4. The first input/output port of the feed circuit FC is connected to a first end of the coil L3 through wiring W5, and a second end of the coil L3 is connected to the second input/output port of the feed circuit FC through wiring W6. The first input/output port of the feed circuit FC is connected to a first end of the coil L4 through wiring W7, and a second end of the coil L4 is connected to the second input/output port of the feed circuit FC through wiring W8. In this manner, when the coil antennas are connected in parallel to each other, even if the coil inductance values are uneven or any of the coil antennas becomes defective, the other coil antennas can compensate for that defect.

Also in the present embodiment, each of the wiring W1 to W8 connecting the coil antennas and the feed circuit FC is routed outside the area formed by an imaginary straight line that connects the center positions of the coil antennas (coil L1, coil L2, coil L3, and coil L4) together. Moreover, each of the wiring W1 to W8 is routed outside the planar conductor 11. Routing the wiring W1 to W8 in this manner widens the area usable as the antenna device in the planar conductor 11.

As in the present embodiment, when seen from a direction normal to the planar conductor 11, the coil antennas (coils L1 to L4) may be arranged such that all of them are located within the area of the planar conductor 11. Because the core of each of the coil antennas is magnetic, currents that cancel out each other do not tend to occur for any arrangement.

The other configurations, operations, and advantageous effects are substantially the same as those of the antenna device according to the first embodiment.

Third Embodiment

Figure 7A:
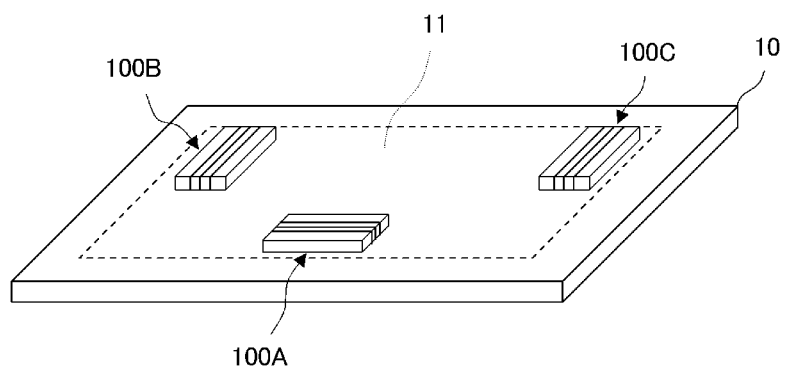
FIG. 7(A) is a perspective view of an antenna device 203 according to a third embodiment and FIG. 7(B) is a plan view thereof.
Figure 7B:
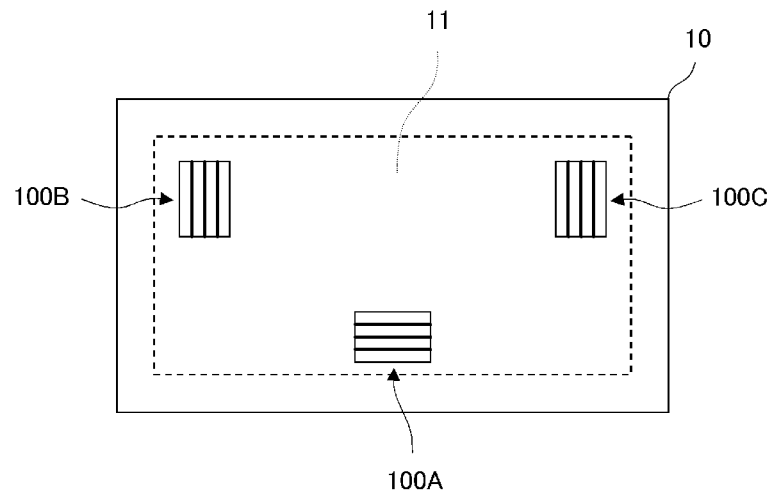

FIG. 7(A) is a perspective view of an antenna device 203 according to a third embodiment and FIG. 7(B) is a plan view thereof.

As illustrated in FIGS. 7(A) and 7(B), the antenna device 203 according to the third embodiment is the one in which the first coil antenna 100A is arranged in the vicinity of one of the two long sides of the rectangular planar conductor 11 and the second coil antenna 100B and the third coil antenna 100C are arranged in the vicinities of the two short sides. In this manner, the arrangement in which a plurality of coil antennas are arranged such that the coil openings thereof face each other in the direction of the long sides of the planar conductor 11 enables a magnetic flux to be efficiently guided to the coil antennas.

As illustrated in FIGS. 7(A) and 7(B), the arrangement in which the plurality of coil antennas 100A, 100B, and 100C are asymmetric with respect to the center of the planar conductor 11 enables the antenna device 203 to have directivity. Accordingly, for example, arrangement of the plurality of coil antennas with respect to the planar conductor 11 can be set such that, in a state where the antenna device 203 is embedded in a communication terminal apparatus, the directivity direction is inclined to the longitudinal direction of the housing.

The coil antennas may be connected in series, or alternatively, may also be connected in parallel.

Fourth Embodiment

Figure 8A:
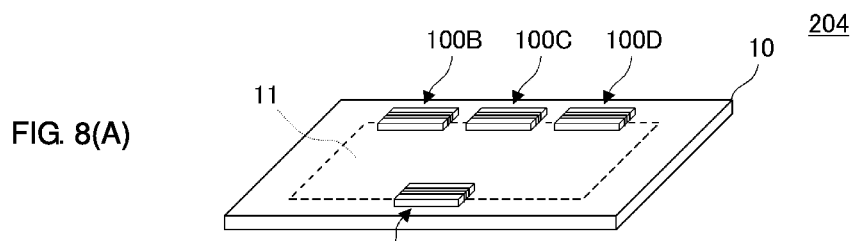
FIG. 8(A) is a perspective view of an antenna device 204 according to a fourth embodiment.
Figure 8B:
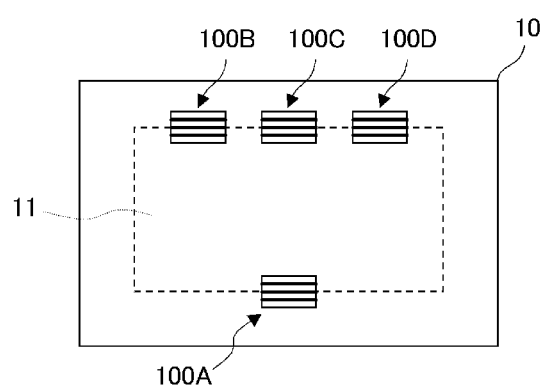
FIG. 8(B) is a plan view thereof.
Figure 8C:
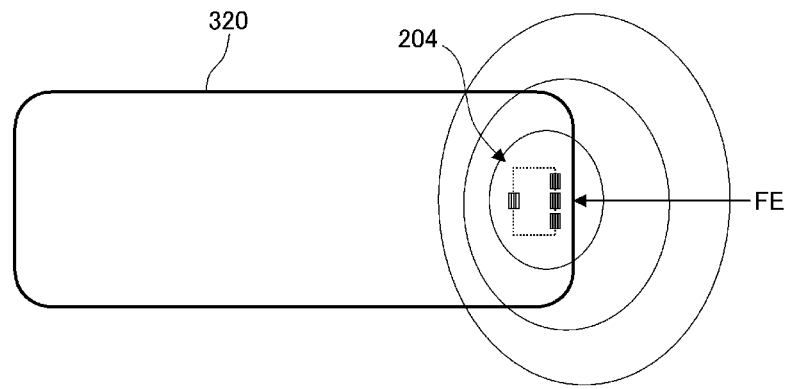
FIG. 8(C) is a plan view that illustrates a state where the antenna device 204 is embedded in a communication terminal apparatus, FIG. 8(*d*) is a cross-sectional view thereof.

FIG. 8(A) is a perspective view of an antenna device 204 according to a fourth embodiment, and FIG. 8(B) is a plan view thereof. FIG. 8(C) is a plan view that illustrates a state where the antenna device 204 is embedded in a communication terminal apparatus, and FIG. 8(D) is a front view thereof.

As illustrated in FIGS. 8(A) and 8(B), the antenna device 204 according to the present embodiment is the one in which the first coil antenna 100A is disposed on one of the four sides of the rectangular planar conductor 11 and the second coil antenna 100B, the third coil antenna 100C, and the fourth coil antenna 100D are disposed on the opposed side. In this manner, the arrangement in which the plurality of coil antennas 100A, 100B, 100C, and 100D are arranged asymmetric with respect to the center of the planar conductor 11 enables the antenna device 204 to have directivity. In the present embodiment, the communication distance for the side on which the second coil antenna 100B, the third coil antenna 100C, and the fourth coil antenna 100D are disposed can be increased.

Figure 8D:
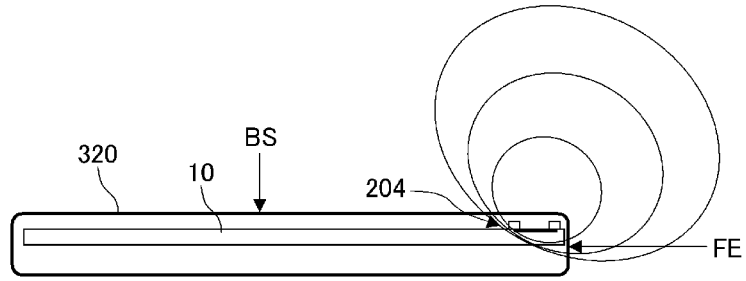

As illustrated in FIGS. 8(C) and 8(D), the antenna device 204 is arranged in a leading end portion of the terminal housing 320 of the communication terminal apparatus. That is, arrangement in which the antenna device 204, which is asymmetric to have directivity in the above-described direction, is positioned at the base 10 (printed substrate) such that the side on which the second coil antenna 100B, the third coil antenna 100C, and the fourth coil antenna 100D are arranged is situated at the leading end portion of the terminal housing 320 enables the communication terminal apparatus to have the illustrated directivity.

The coil antennas may be connected in series, or alternatively, may also be connected in parallel.

Fifth Embodiment

Figure 9A:
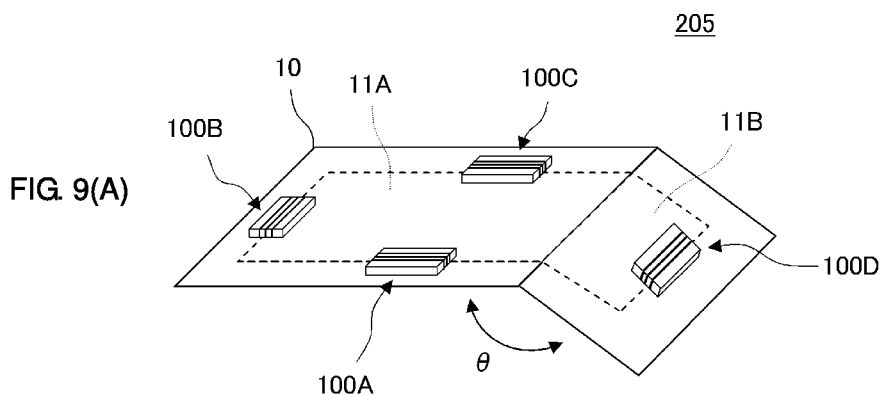
FIG. 9(A) is a perspective view of an antenna device 205 according to a fifth embodiment and FIG. 9(B) is a front view that illustrates a state where the antenna device 205 is embedded in a communication terminal apparatus.
Figure 9B:
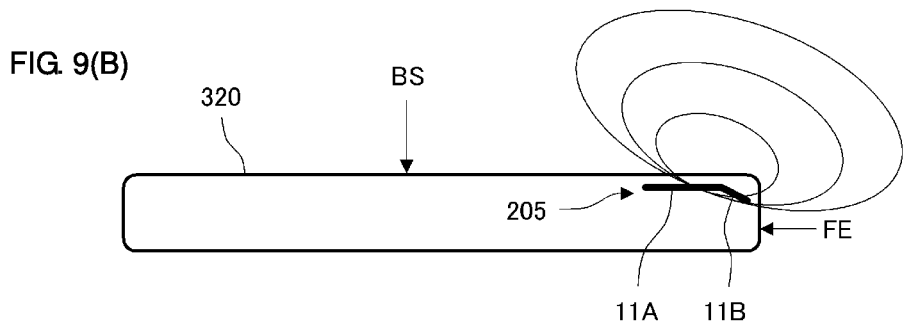

FIG. 9(A) is a perspective view of an antenna device 205 according to a fifth embodiment and FIG. 9(B) is a front view that illustrates a state where the antenna device 205 is embedded in a communication terminal apparatus.

As illustrated in FIG. 9(A), the antenna device 205 according to the present embodiment includes a first planar conductor region 11A in which the first coil antenna 100A, the second coil antenna 100B, and the third coil antenna 100C are arranged and a second planar conductor region 11B in which the fourth coil antenna 100D is arranged. The first planar conductor region 11A and the second planar conductor region 11B are formed on respective planes that intersect each other at a predetermined angle θ. In this case, the antenna device has directivity in a direction that is intermediate between a direction normal to the first planar conductor region 11A and a direction normal to the second planar conductor region 11B and can have an increased communication distance in that direction.

As illustrated in FIG. 9(B), the antenna device 205 is arranged on a front end FE side of the terminal housing 320 of the communication terminal apparatus. That is, arrangement in which the antenna device 205, which is asymmetric to have directivity in that direction, is positioned in the vicinity of the back surface BS of the terminal housing 320 and the second planar conductor region 11B is disposed on the leading end portion FE side enables the communication terminal apparatus to have the illustrated directivity.

The coil antennas may be connected in series, or alternatively, may also be connected in parallel. To prevent an increase in the loss of a current flowing through the first planar conductor region 11A and the second planar conductor region 11B, it is preferable that the angle θ formed between the first planar conductor region 11A and the second planar conductor region 11B be larger than 90° and smaller than 135°.

Sixth Embodiment

Figure 10A:
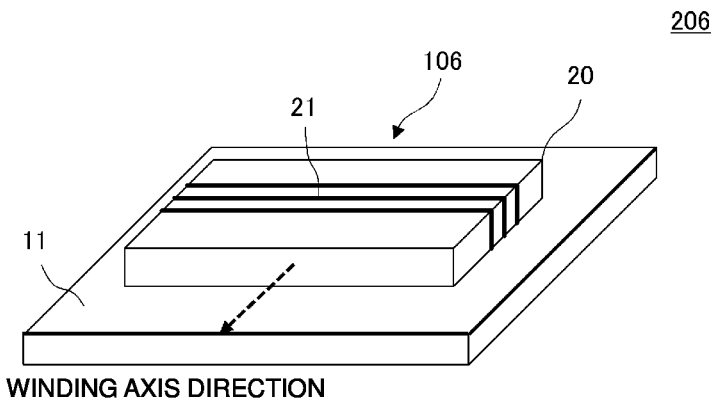
FIG. 10(A) is a perspective view of an antenna device 206 according to a sixth embodiment and FIG. 10(B) is an exploded perspective view thereof.
Figure 10B:
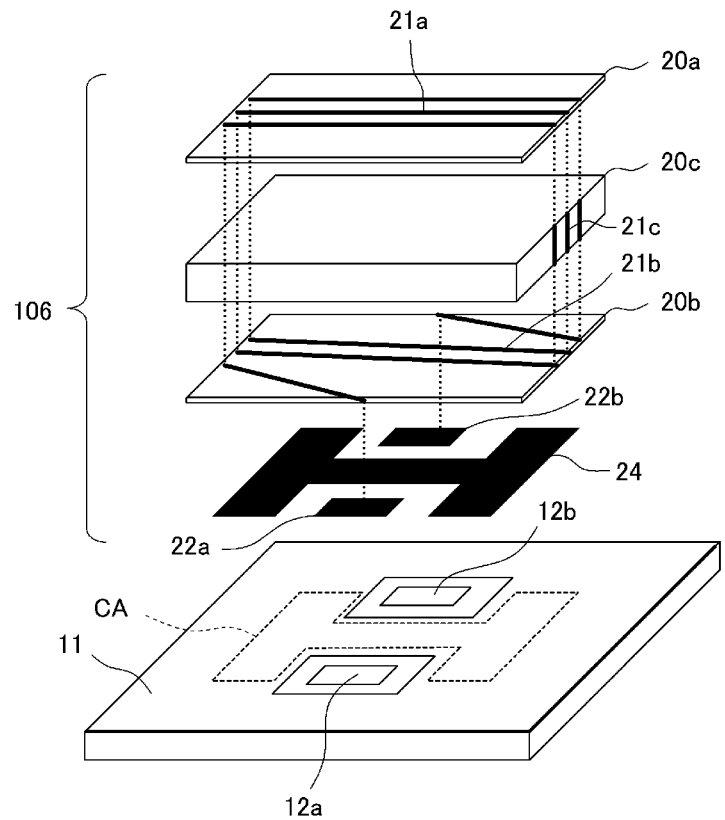

FIG. 10(A) is a perspective view of an antenna device 206 according to a sixth embodiment and FIG. 10(B) is an exploded perspective view thereof. As illustrated in FIGS. 10(A) and 10(B), the antenna device 206 includes a chip coil antenna 106 and the planar conductor 11. The coil antenna 106 and the planar conductor 11 are directly connected to each other with a conductive binder, such as solder, disposed therebetween.

The coil antenna 106 includes, as a body, a stacked magnetic core in which magnetic layers 20a, 20c, and 20b are stacked. A conductive pattern 21a on the surface of the magnetic layer 20a, a conductive pattern 21c on the side surface of each of the magnetic layers 20a, 20c, and 20b, and a conductive pattern 21b on the surface of the magnetic layer 20b form a coil conductor. Input/output-terminal connection electrodes 22a and 22b for use in connecting to input/output terminals 12a and 12b and a coupling electrode 24 for use in connecting to the planar conductor 11 are disposed on the back surface of the magnetic layer 20b, that is, on the mounting surface of the coil antenna 106.

The coil conductor is connected at one end to the input/output-terminal connection electrode 22a and is connected at the other end to the input/output-terminal connection electrode 22b.

The input/output-terminal connection electrodes 22a and 22b are connected and fixed to the input/output terminals 12a and 12b with a conductive binder, such as solder, disposed therebetween. The coupling electrode 24 is connected and fixed to a connection area CA indicated by the broken lines in FIG. 10(B) with a conductive binder, such as solder, disposed therebetween, the connection area CA being a part of the planar conductor 11.

The input/output terminals 12a and 12b are connected to an input/output port of a feed circuit and another coil antenna.

In the antenna device 206, an eddy current (induced current) flowing through the planar conductor 11 is also guided to the coupling electrode 24 through the conductive binder because the planar conductor 11 and the coupling electrode 24 have the same potential. A current flowing in a direction opposite to the direction of the current flowing in the coupling electrode 24 flows through the conductive pattern 21b on the surface of the magnetic layer 20b, and as a result, the current flows through the coil conductor. In particular, according to the present embodiment, because the coupling electrode 24 and the coil conductor face each other such that the magnetic layer is disposed therebetween, a magnetic field produced by the current flowing in the coupling electrode 24 is trapped in the magnetic layer and is efficiently guided to the coil conductor. Accordingly, the degree of the magnetic field coupling between the coupling electrode 24 and the coil conductor can be increased, and the antenna device with a reduced loss can be achieved.

Seventh Embodiment

Figure 11A:
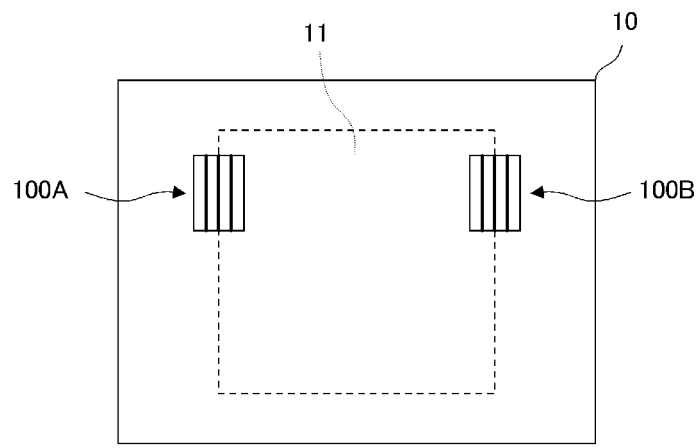
FIG. 11(A) is a plan view of an antenna device 207 according to a seventh embodiment and FIG. 11(B) illustrates a relation between winding axis directions of coil conductors of coil antennas and the planar conductor 11.
Figure 11B:
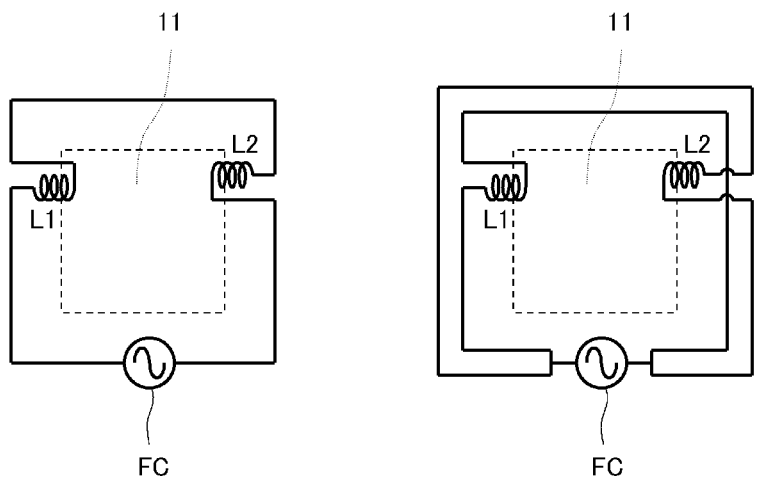

FIG. 11(A) is a plan view of an antenna device 207 according to a seventh embodiment and FIG. 11(B) illustrates a relation between the winding axis directions of the coil conductors of the coil antennas and the planar conductor 11. The coil conductors of the coil antennas are denoted as coils L1 and L2 here.

In the present invention, the number of coil antennas is not limited to three or more. As illustrated in FIG. 11(A), the two coil antennas 100A and 100B may be used. Arrangement in which the two coil antennas 100A and 100B are asymmetric with respect to the center of the planar conductor 11 enables the antenna device 207 to have directivity. Also in this case, as illustrated in FIG. 11(B), the coil conductors (coils L1 and L2) of the two coil antennas may be connected in series, or alternatively, may also be connected in parallel.

An increase in the number of coil antennas facilitates the coil conductors to catch an eddy current occurring in the planar conductor 11, but increases the size of the antenna device accordingly. The number of coil antennas can be determined in consideration of balance between the electric characteristics required for the antenna device and the size.

Eighth Embodiment

Figure 12A:
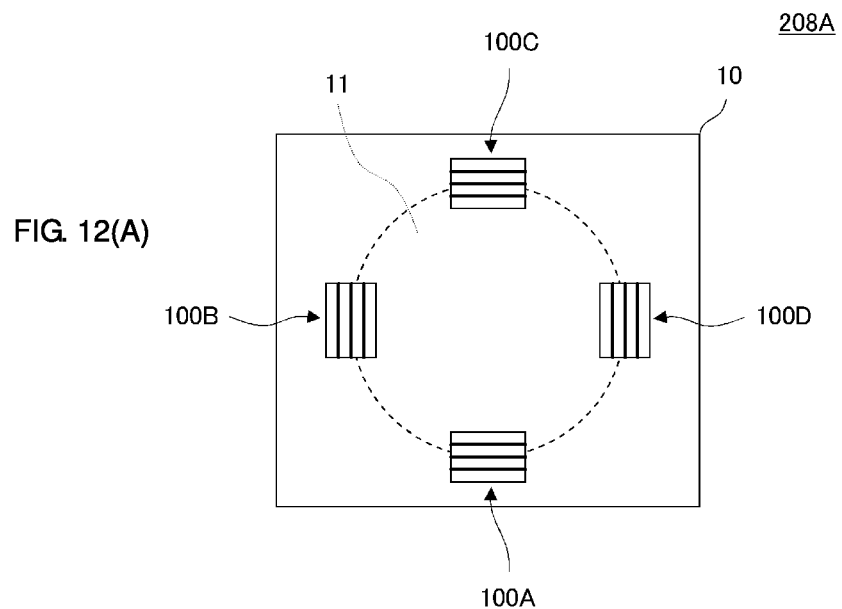
FIGS. 12(A) and 12(B) are plan views of antenna devices 208A and 208B according to an eighth embodiment, respectively.
Figure 12B:
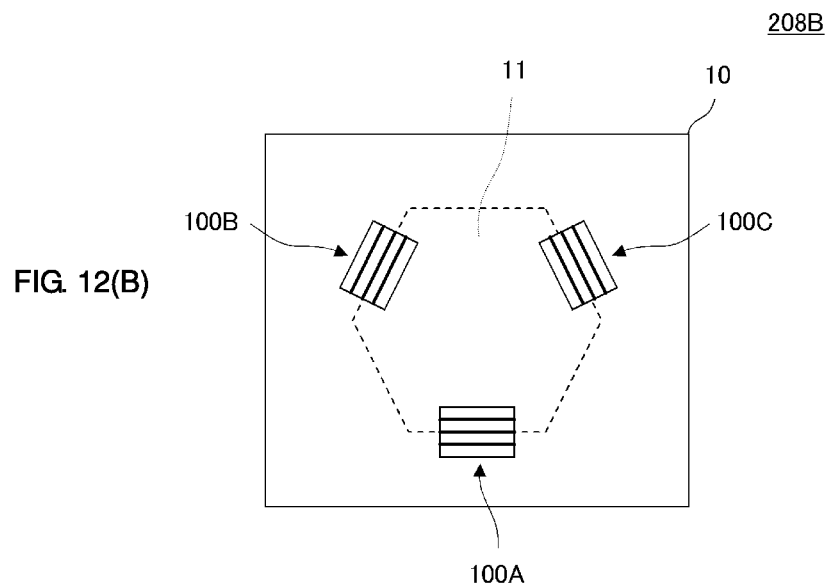

FIGS. 12(A) and 12(B) are plan views of antenna devices 208A and 208B according to an eighth embodiment, respectively. In the present invention, the shape of the planar conductor 11 is not limited to a rectangular. For example, as illustrated in FIG. 12(A), the planar conductor 11 may be circular. Alternatively, as illustrated in FIG. 12(B), the planar conductor 11 may be hexagonal. In FIGS. 12(A) and 12(B), a coil antenna having substantially the same configuration as any of the coil antennas described above may be applied to the coil antennas 100A, 100B, 100C, and 100D.

Ninth Embodiment

Figure 13A:
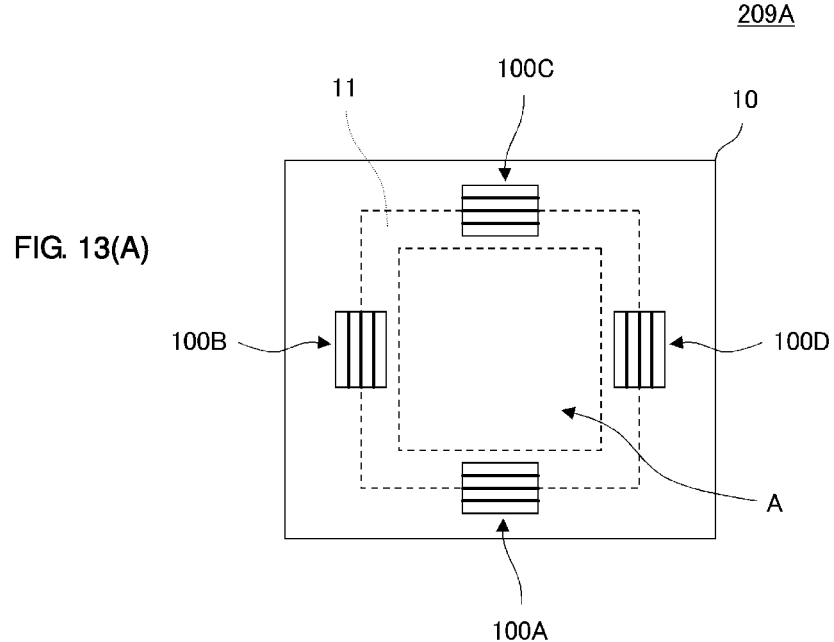
FIGS. 13(A) and 13(B) are plan views of antenna devices 209A and 209B according to a ninth embodiment, respectively.
Figure 13B:
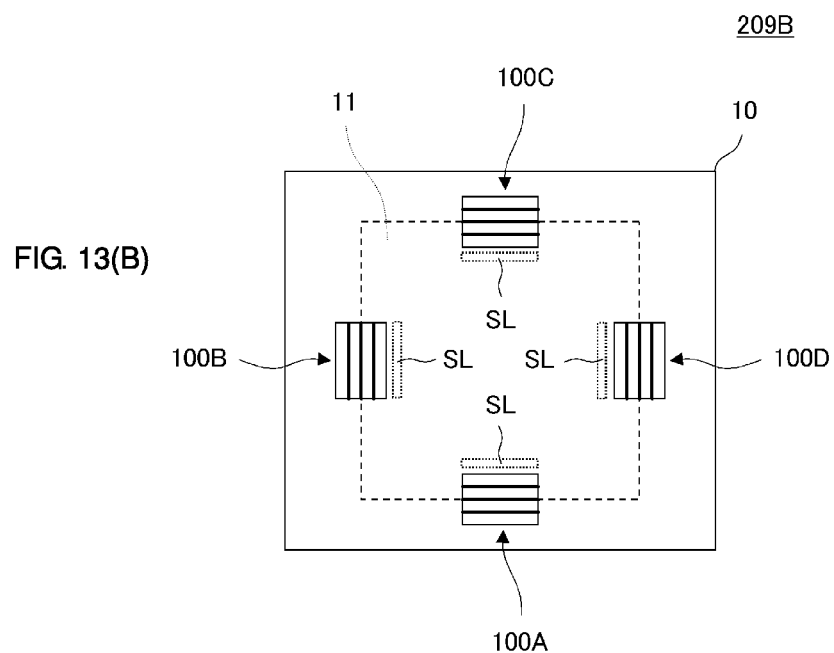

FIGS. 13(A) and 13(B) are plan views of antenna devices 209A and 209B according to a ninth embodiment, respectively. In the present invention, the shape of the planar conductor 11 is not limited to a continuous planar shape. For example, as illustrated in FIG. 13(A), the planar conductor 11 may have an opening A in the central portion, or alternatively, as illustrated in FIG. 13(B), the planar conductor 11 may have a slit SL in the vicinity of a coil opening of each of the coil antennas 100A, 100B, 100C, and 100D. These structures allow a magnetic flux to exit through the opening A or the slit SL and thus enable communication to not only a first main surface side but also a second main surface side. Additionally, the total magnetic flux is also increased, and the distance at which communication can be carried out is also increased.

Tenth Embodiment

Figure 14A:
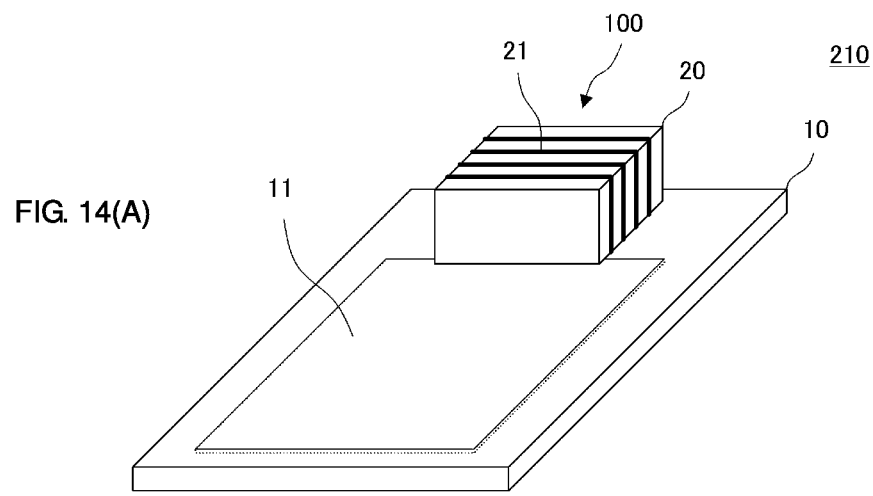
FIG. 14(A) is a perspective view of an antenna device 210 according to a tenth embodiment.
Figure 14B:
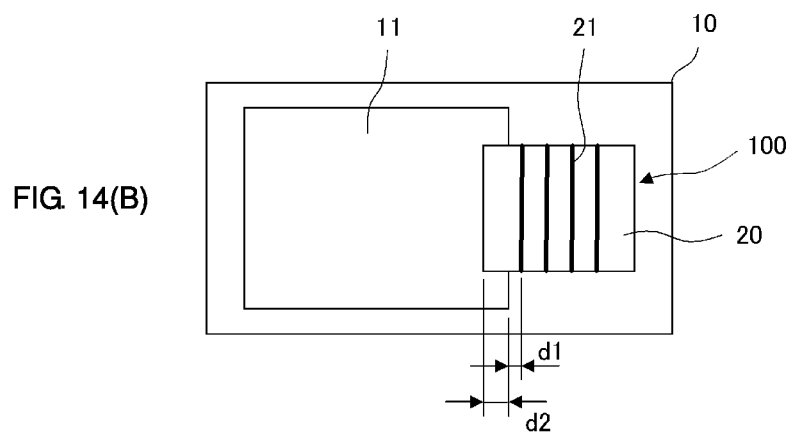
FIG. 14(B) is a plan view thereof.
Figure 14C:
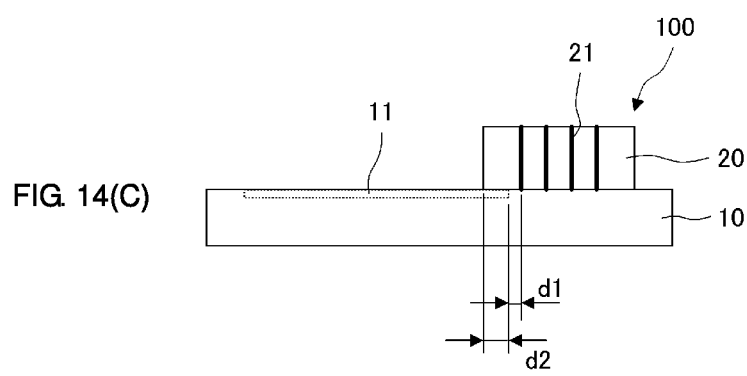
FIG. 14(C) is a front view thereof.

FIG. 14(A) is a perspective view of an antenna device 210 according to a tenth embodiment, FIG. 14(B) is a plan view thereof, and FIG. 14(C) is a front view thereof.

The base 10 of the antenna device 210 is a printed wiring board. The planar conductor 11 is disposed on the base 10. The coil antenna 100 includes the magnetic core 20 and the coil conductor 21 wound around the magnetic core 20. The coil antenna 100 is arranged such that a coil opening of the coil conductor is adjacent (close) to the edge end portion of the planar conductor 11.

Here, it is preferable that 0<d1<d2, where d2 is the distance from the inner end face of the magnetic core 20 to the edge end of the planar conductor 11 and d1 is the distance from the inner end portion of the winding region of the coil conductor to the edge end of the planar conductor 11. When d1 is small or d2 is large, the degree of coupling between the coil conductor 21 and the planar conductor 11 is high, that is, the induced current is increased; as a result, an advantageous effect of increasing a magnetic flux from the planar conductor 11 is obtainable.

Figure 15A:
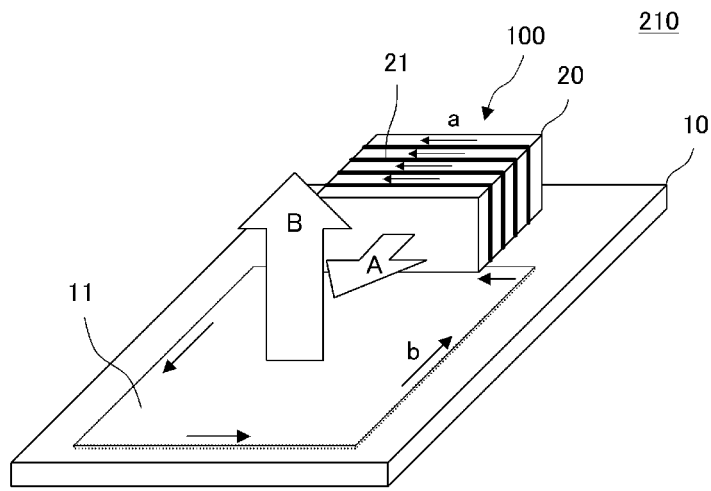
FIG. 15(A) is a perspective view that illustrates a direction of each of a current that flows through a coil conductor of a coil antenna 100 in the antenna device 210, a current that flows through the planar conductor 11, a magnetic field produced by the coil antenna 100, and a magnetic field produced by the planar conductor 11.
Figure 15B:
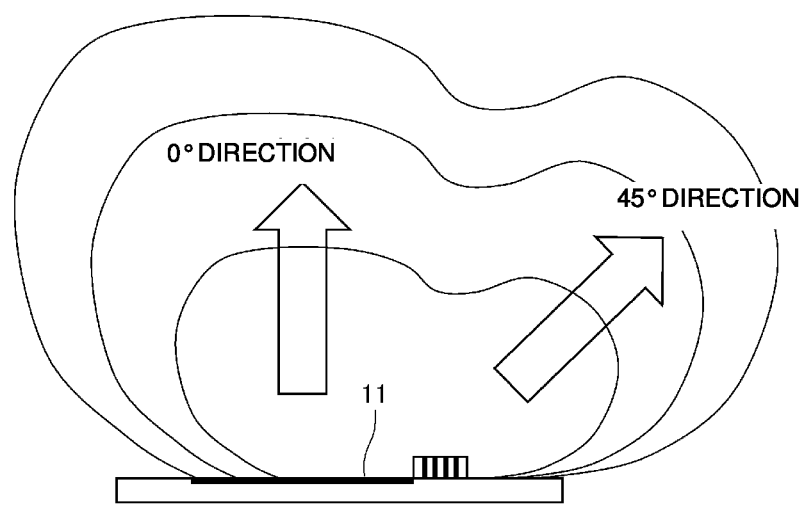
FIG. 15(B) illustrates a relation between a current that flows through the planar conductor 11 and a magnetic flux that occurs.

FIG. 15(A) is a perspective view that illustrates a direction of each of a current that flows through the coil conductor of the coil antenna 100 in the antenna device 210, a current that flows through the planar conductor 11, a magnetic field produced by the coil antenna 100, and a magnetic field produced by the planar conductor 11. FIG. 15(B) illustrates a relation between a current that flows through the planar conductor 11 and a magnetic flux produced by the current.

A current "a" flowing through the coil conductor 21 induces a current "b" in the planar conductor 11. As a result, a magnetic field occurs in the coil antenna 100 in the direction indicated by the arrow A, and a magnetic field occurs in the planar conductor 11 in the direction indicated by the arrow B. When a magnetic flux is introduced from a coil antenna at the other end in communication, a phenomenon opposite to the above occurs. That is, the planar conductor 11 functions as a booster antenna, and a magnetic field larger than a magnetic field produced by the coil antenna 100 alone can be produced. In this example, as illustrated in FIG. 15(B), directivity in the 0° direction and that in the 45° direction are enhanced.

The reason why the above phenomenon, in which such a large magnetic field can be produced, occurs can be that, when seen from a direction normal to the planar conductor 11, the direction of a current flowing through the coil conductor 21 and the direction of a current circulating in the edge end of the planar conductor 11 are the same.

Figure 16A:
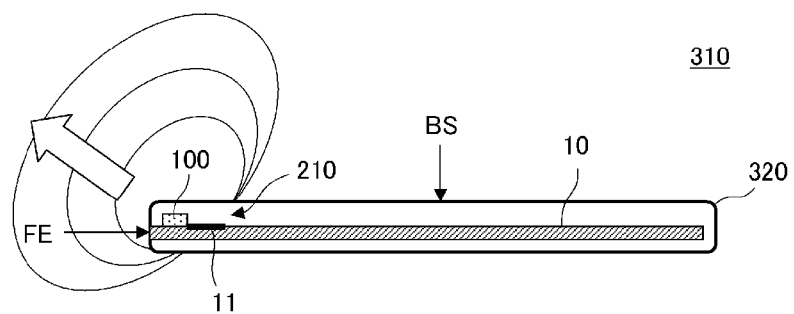
FIG. 16(A) is a cross-sectional view of a communication terminal apparatus 310 including the antenna device 210 and FIG. 16(B) illustrates an inside portion thereof seen from below.
Figure 16B:
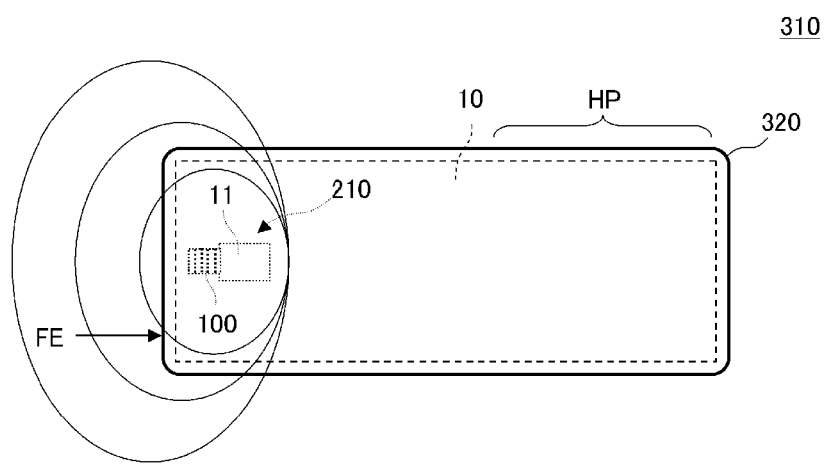

FIG. 16(A) is a cross-sectional view of a communication terminal apparatus 310 including the antenna device 210 and FIG. 16(B) is a plan view that illustrates an inside portion thereof. As illustrated in FIG. 15(A), a magnetic flux produced by the coil antenna 100 and a magnetic flux produced by the planar conductor 11 are combined, and the antenna device 210 has directivity in the direction indicated by the arrow illustrated in FIG. 16(A). That is, arrangement of the coil antenna 100 in the antenna device 210 on the end portion side of the terminal housing 320 enables the antenna device 210 to have a high gain in an inclined direction between the back surface BS direction and the leading end FE direction of the terminal housing 320 of the communication terminal apparatus 310. Accordingly, when a user grips a proximal portion HP of the communication terminal apparatus 310 and holds the lower surface side angle of the leading end portion over an object at the other end in communication, the communication can be carried out with a high gain.

11th Embodiment

Figure 17A:
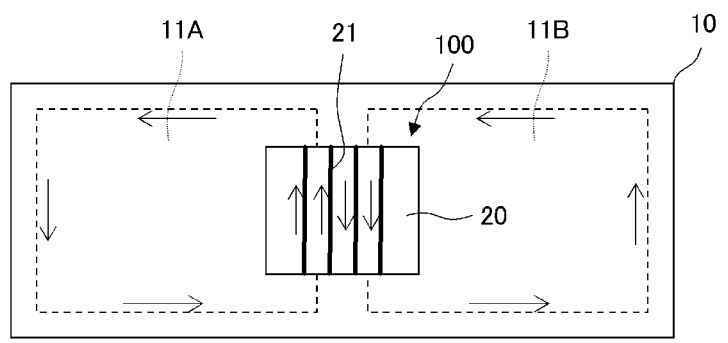
FIG. 17(A) is a plan view of an antenna device 211 according to an 11th embodiment and FIG. 17(B) is a front view thereof.
Figure 17B:
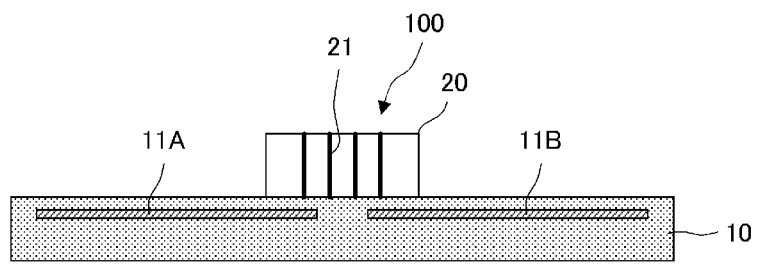

FIG. 17(A) is a plan view of an antenna device 211 according to an 11th embodiment and FIG. 17(B) is a front view thereof. In the antenna device 211, the two planar conductors 11A and 11B are disposed inside the base 10. The base 10 is a printed wiring board. The coil antenna 100 includes the magnetic core 20 and the coil conductor 21 wound around the magnetic core 20. Both ends of the coil conductor 21 are not connected to the planar conductors 11A and 11B, and the planar conductors 11A and 11B are in an insulated state in terms of direct current. The coil conductor 21 has a circuit configuration illustrated in FIG. 17(C).

The coil antenna 100 and the planar conductors 11A and 11B are arranged such that the two coil openings of the coil conductor 21 of the coil antenna 100 are adjacent (close) to the edge end portions of the planar conductors 11A and 11B, respectively.

Figure 17C:
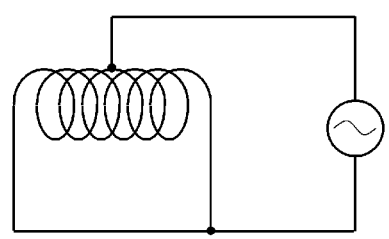

In the structure illustrated in FIGS. 17(A) to 17(C), the direction of a current circulating in the edge end of the planar conductor 11A and that in the edge end of the planar conductor 11B are the same. Thus magnetic fields in the planar conductors are mutually strengthened, and the communication distance is further increased.

12th Embodiment

Figure 18:
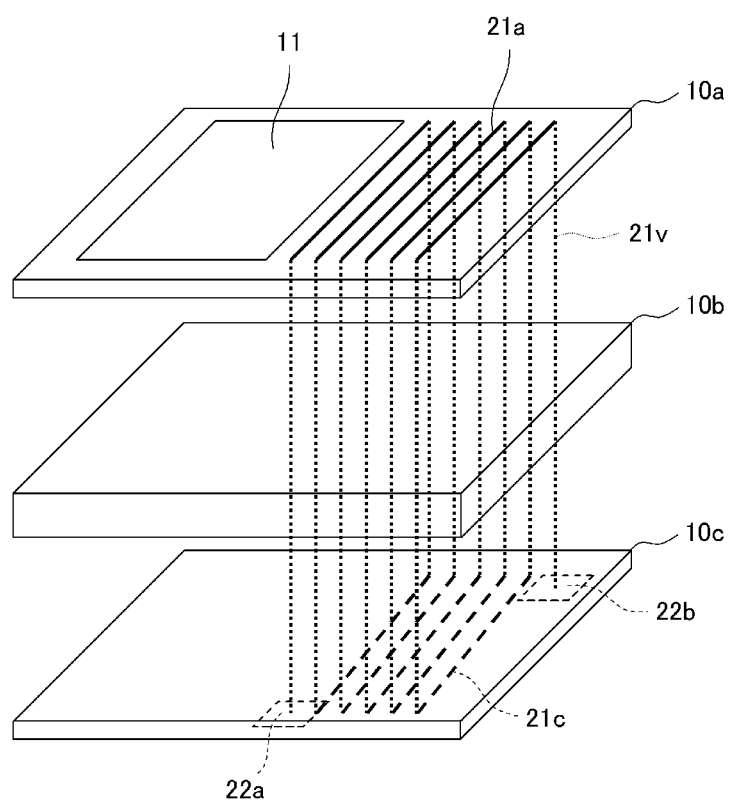
FIG. 18 is an exploded perspective view of an antenna device 212 according to a 12th embodiment.

FIG. 18 is an exploded perspective view of an antenna device 212 according to a 12th embodiment. A base is made of a stacked substrate in which base layers 10a, 10b, and 10c are stacked. The conductive pattern 21a is disposed on the base layer 10a, and the conductive pattern 21c is disposed on the base layer 10c. The base layers 10a, 10b, and 10c have via conductors 21v. The conductive patterns 21a and 21c and the via conductors 21v form a single coil conductor having a plurality of turns. The input/output-terminal connection electrodes 22a and 22b are disposed on the lower surface of the base layer 10c.

The planar conductor 11 is disposed on the base layer 10a. The planar conductor 11 is disposed such that the edge end portion is adjacent (close) to a coil opening of the coil conductor. In this manner, the antenna device in which the coil antenna and the planar conductor are integrated in the stacked substrate is configured.

13th Embodiment

Figure 19A:
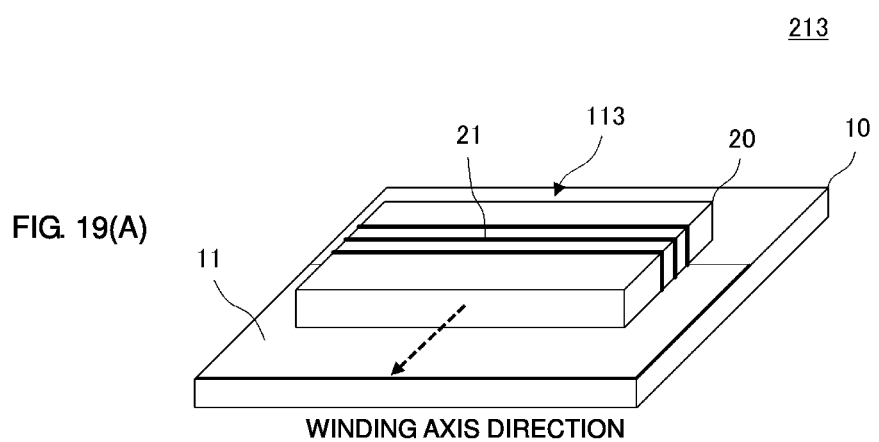
FIG. 19(A) is a perspective view of an antenna device 213 according to a 13th embodiment and FIG. 19(B) is a cross-sectional view thereof.
Figure 19B:
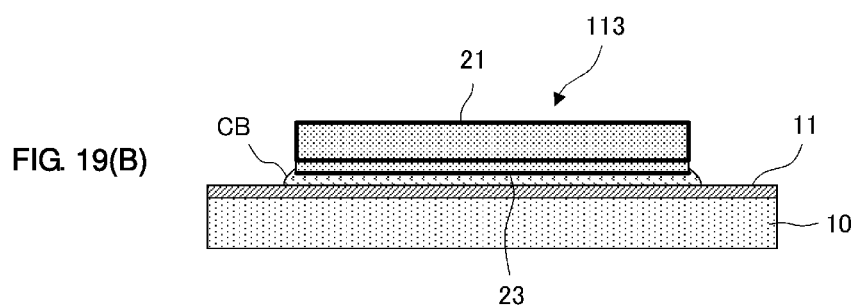
Figure 20A:
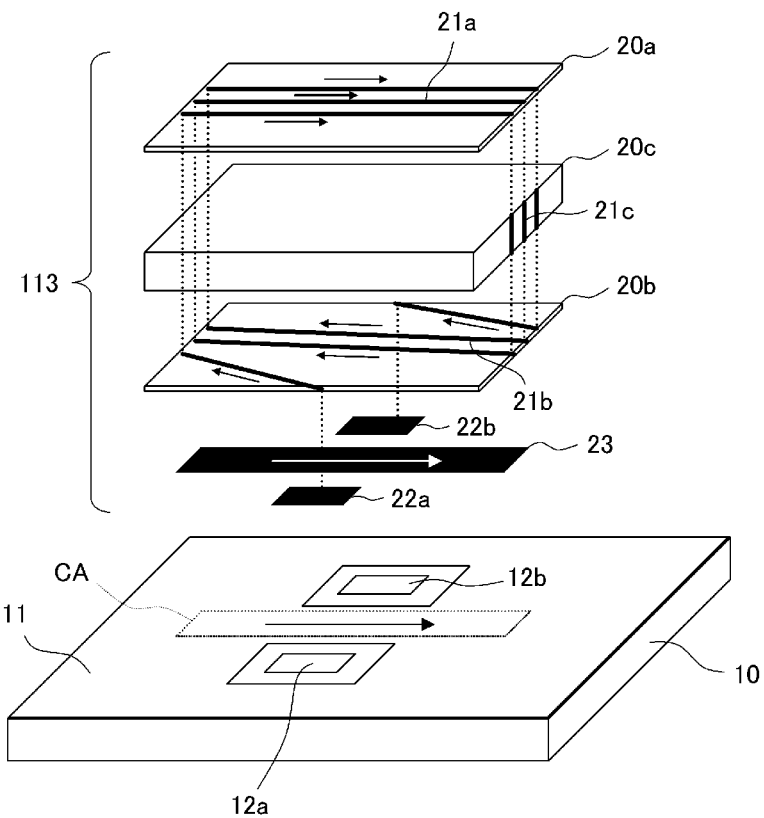
FIG. 20(A) is an exploded perspective view of the antenna device 213.
Figure 20B:
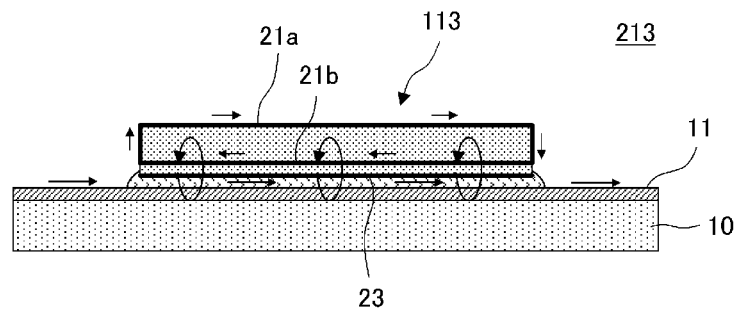
FIG. 20(B) is a cross-sectional view thereof and illustrates behavior of a current and a magnetic flux.

FIG. 19(A) is a perspective view of an antenna device 213 according to a 13th embodiment and FIG. 19(B) is a cross-sectional view thereof. FIG. 20(A) is an exploded perspective view of the antenna device 213, and FIG. 20(B) is a cross-sectional view thereof and illustrates behavior of a current and a magnetic flux. The antenna device 213 includes a chip coil antenna 113 and the planar conductor 11. The coil antenna 113 and the planar conductor 11 are directly connected to each other with a conductive binder cb, such as solder, disposed therebetween.

The coil antenna 113 includes, as a body, a stacked magnetic core in which the magnetic layers 20a, 20c, and 20b are stacked. The conductive pattern 21a on the surface of the magnetic layer 20a, the conductive pattern 21c on the side surface of each of the magnetic layers 20a, 20c, and 20b, and the conductive pattern 21b on the surface of the magnetic layer 20b form a coil conductor.

The input/output-terminal connection electrodes 22a and 22b for use in connecting to the input/output terminals 12a and 12b and a strip coupling electrode 23 are disposed on the back surface of the magnetic layer 20b, that is, on the mounting surface of the coil antenna 113. The coil conductor is connected at one end to the input/output-terminal connection electrode 22a through a via conductor and is connected at the other end to the input/output-terminal connection electrode 22b through a via conductor.

The input/output-terminal connection electrodes 22a and 22b are connected and fixed to the input/output terminals 12a and 12b with a conductive binder, such as solder, disposed therebetween. The coupling electrode 23 is connected and fixed to the connection area CA indicated by the broken lines in FIG. 20(A) with a conductive binder, such as solder, disposed therebetween, the connection area CA being a part of the planar conductor 11.

The input/output terminals 12a and 12b are connected to an input/output port of a feed circuit and another coil antenna.

In the antenna device 213, an eddy current (induced current) flowing through the planar conductor 11 is also guided to the coupling electrode 23 through the conductive binder because the planar conductor 11 and the coupling electrode 23 have the same potential. A current flowing in a direction opposite to the direction of the current flowing in the coupling electrode 23 flows through the conductive pattern 21b on the surface of the magnetic layer 20b, and as a result, the current flows through the coil conductor. In particular, according to the present embodiment, because the coupling electrode 23 and the coil conductor face each other such that the magnetic layer is disposed therebetween, a magnetic field produced by the current flowing in the coupling electrode 23 is trapped in the magnetic layer and is efficiently guided to the coil conductor. Accordingly, the degree of the magnetic field coupling between the coupling electrode 23 and the coil conductor can be increased, and the antenna device with a reduced loss can be achieved.

14th Embodiment

Figure 21A:
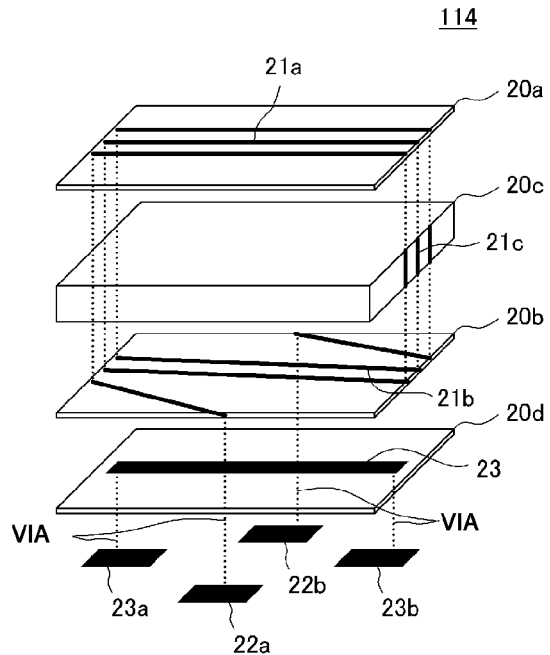
FIG. 21(A) is an exploded perspective view of a coil antenna 114 included in an antenna device according to a 14th embodiment and FIG. 21(B) is a cross-sectional view of the antenna device 214 according to the 14th embodiment.
Figure 21B:
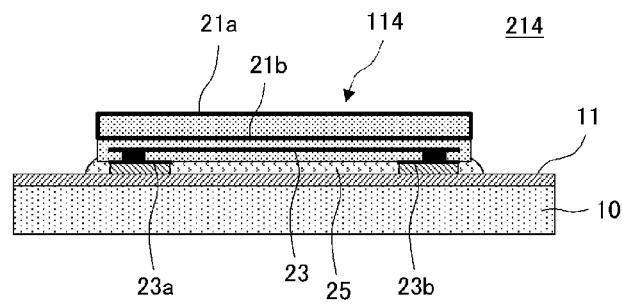

FIG. 21(A) is an exploded perspective view of a coil antenna 114 included in an antenna device according to a 14th embodiment and FIG. 21(B) is a cross-sectional view of the antenna device 214 according to the 14th embodiment. The antenna device 214 includes the chip coil antenna 114 and the planar conductor 11. The coil antenna 114 and the planar conductor 11 are directly connected to each other with a conductive binder, such as solder, disposed therebetween.

The coil antenna 114 includes, as a body, a stacked magnetic core in which the magnetic layers 20a, 20c, 20b, and 20d are stacked. The conductive pattern 21a on the surface of the magnetic layer 20a, the conductive pattern 21c on the side surface of each of the magnetic layers 20a, 20c, and 20b, and the conductive pattern 21b on the surface of the magnetic layer 20b form a coil conductor.

The coupling electrode 23 is disposed on the upper surface of the magnetic layer 20d. The input/output-terminal connection electrodes 22a and 22b electrically connected to both ends of the coil conductor through via conductors and coupling-electrode connection electrodes 23a and 23b electrically connected to both ends of the coupling electrode 23 through via conductors are disposed on the back surface of the magnetic layer 20d, that is, on the mounting surface of the coil antenna 114.

The input/output-terminal connection electrodes 22a and 22b are connected and fixed to the input/output terminals on the base 10 with a conductive binder, such as solder, disposed therebetween. The coupling-electrode connection electrodes 23a and 23b are connected and fixed to the connection area being a part of the planar conductor 11 with a conductive binder, such as solder, disposed therebetween. An underfill 25 is disposed on the lower surface of the coil antenna 114.

In the antenna device 214, an eddy current (induced current) flowing through the planar conductor 11 is also guided to the coupling electrode 23 through the conductive binder. A current flowing in a direction opposite to the direction of the current flowing in the coupling electrode 23 flows through the conductive pattern 21b on the surface of the magnetic layer 20b, and as a result, the current flows through the coil conductor. In particular, according to the present embodiment, because the coupling electrode 23 and the coil conductor face each other such that the magnetic layer is disposed therebetween, a magnetic field produced by the current flowing in the coupling electrode 23 is trapped in the magnetic layer and is efficiently guided to the coil conductor. Accordingly, the degree of the magnetic field coupling between the coupling electrode 23 and the coil conductor can be increased, and the antenna device with a reduced loss can be achieved.

15th Embodiment

Figure 22:
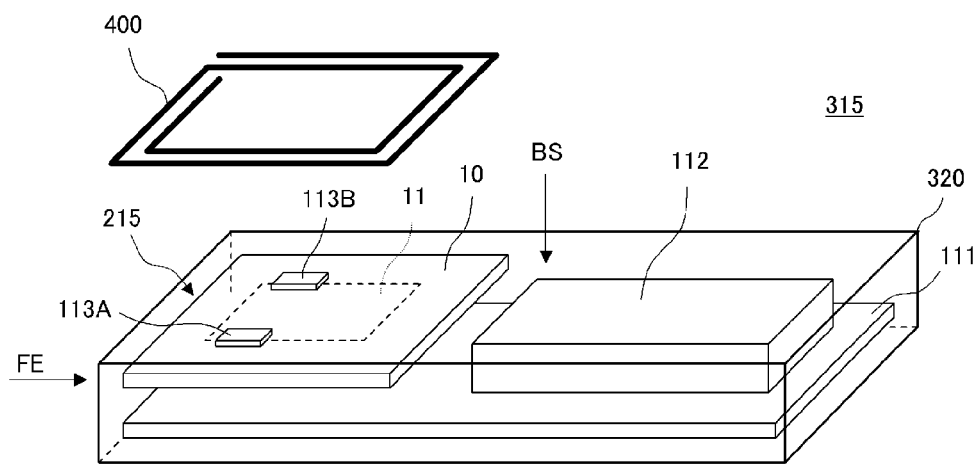
FIG. 22 is a perspective view that illustrates an inside portion of a communication terminal apparatus 315 according to a 15th embodiment.

FIG. 22 is a perspective view that illustrates an inside portion of a communication terminal apparatus 315 according to a 15th embodiment. In the communication terminal apparatus 315, the main substrate 111 and the base 10 as a sub substrate are incorporated in the terminal housing 320, and an antenna device 215 is configured at the base 10. The antenna device 215 includes the planar conductor 11 and two coil antennas 113A and 113B. Each of the coil antennas 113A and 113B is the one illustrated in FIGS. 19 and 20 in the 13th embodiment. In the example illustrated in FIG. 22, the coil antennas 113A and 113B are arranged on two sections of the edge end portion of the planar conductor 11. The antenna device 215 and the battery pack 112 are arranged in the vicinity of the back surface BS of the terminal housing 320.

Because the two coil antennas 113A and 113B of the antenna device 215 are opposed to each other, components in the plane direction (horizontal direction) of the planar conductor 11 of the magnetic fluxes produced by the coil antennas 113A and 113B are cancelled. Thus directivity of the antenna device 215 has a characteristic in which it is directed to a direction normal to the planar conductor 11.

When the communication terminal apparatus 315 is held over the coil antenna 400 at the other end in communication, as illustrated in FIG. 22, the antenna device 215 and the coil antenna 400 at the other end in communication are coupled mainly through an induction field, and predetermined information is transmitted and received.

16th Embodiment

Figure 23A:
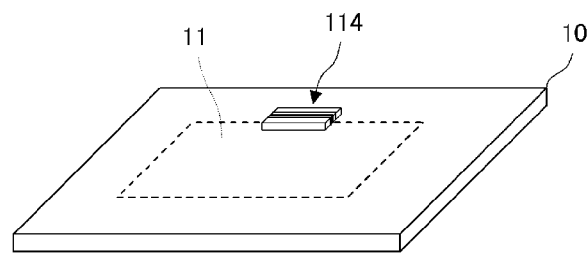
FIG. 23(A) is a perspective view of an antenna device 216 according to a 16th embodiment and FIG. 23(B) is a perspective view that illustrates an inside portion of a communication terminal apparatus 316 including the antenna device 216.
Figure 23B:
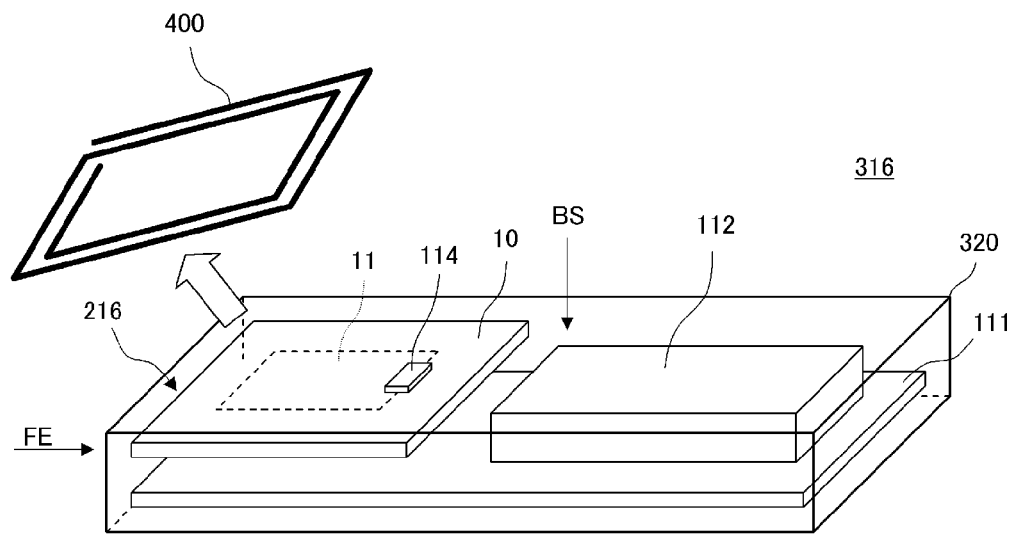

FIG. 23(A) is a perspective view of an antenna device 216 according to a 16th embodiment and FIG. 23(B) is a perspective view that illustrates an inside portion of a communication terminal apparatus 316 including the antenna device 216.

In the communication terminal apparatus 316, the main substrate 111 and the base 10 as a sub substrate are incorporated in the terminal housing 320. The antenna device 216 is configured at the base 10.

The antenna device 216 includes the planar conductor 11 and the single coil antenna 114. The coil antenna 114 is the one illustrated in FIG. 21 in the 14th embodiment. The antenna device 216 and the battery pack 112 are arranged in the vicinity of the back surface BS of the terminal housing 320.

The antenna coil 114 is arranged on the edge end portion of the planar conductor 11 inside the leading end portion FE of the terminal housing 320, a magnetic flux produced by the coil antenna 114 and a magnetic flux produced by the planar conductor 11 are combined, and thus the antenna device 216 has directivity in the direction indicated by the arrow illustrated in FIG. 23(B). That is, the antenna device 216 obtains a high gain in an inclined direction between the back surface BS direction and the leading end FE direction of the terminal housing 320 of the communication terminal apparatus 316. Accordingly, when a user grips the proximal portion of the communication terminal apparatus 316 and holds the lower surface side angle of the leading end portion over the coil antenna 400 at the other end in communication, the communication can be carried out with a high gain.

17th Embodiment

Figure 24:
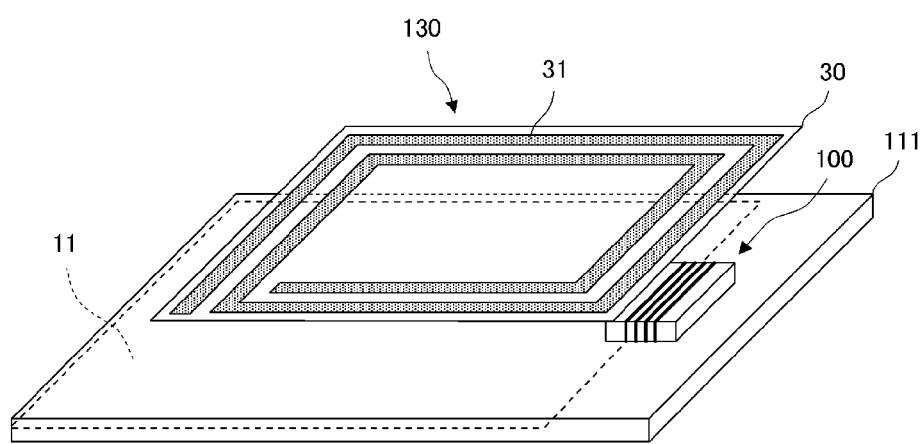
FIG. 24 is a perspective view of an antenna device 217 according to a 17th embodiment.

FIG. 24 is a perspective view of an antenna device 217 according to a 17th embodiment.

The antenna device 217 of the 17th embodiment includes a booster antenna (booster coil) 130 coupled to the coil antenna 100. The planar conductor 11 is disposed inside the main substrate (printed wiring board) 111. The coil opening on a first end face side in the coil antenna 100 faces the planar conductor 11, and the coil antenna 100 is arranged on the upper surface of the main substrate 111. The coil antenna 100 has the same configuration as that illustrated in FIG. 2 and other drawings in the first embodiment.

The booster antenna 130 is coupled to the coil antenna 100 and a coil antenna at the other end in communication and acts as a booster antenna, as described below. The coil antenna 100 is connected to a feed circuit, and that feed circuit carries out communication through the coil antenna 100, the booster antenna 130, and the coil antenna at the other end in communication.

Figure 25A:
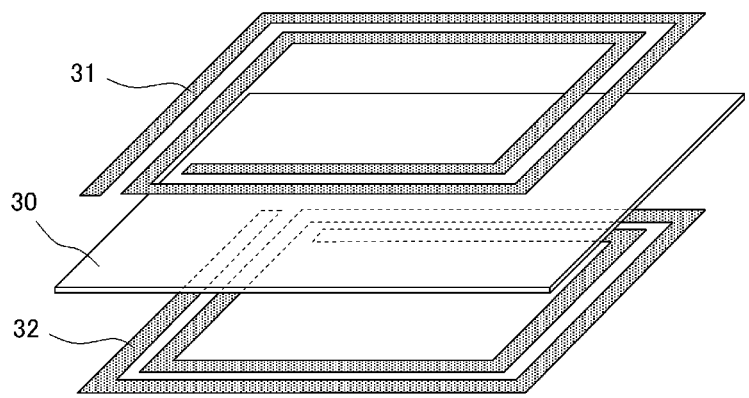
FIG. 25(A) is an exploded perspective view of a booster antenna 130 included in the antenna device 217 and FIG. 25(B) is an equivalent circuit diagram thereof.
Figure 25B:
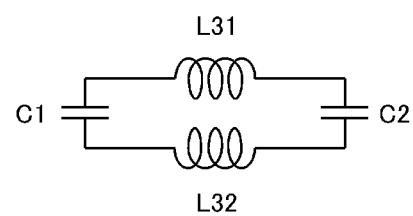
Figure 25C:
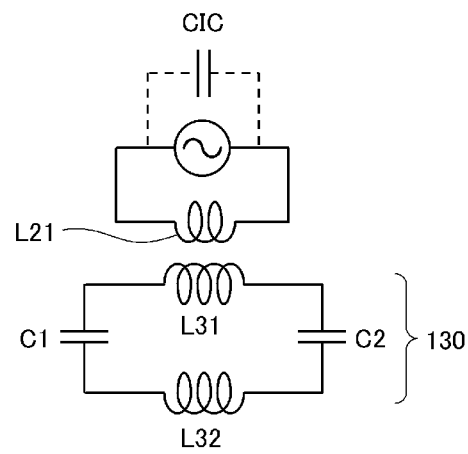
FIG. 25(C) is an equivalent circuit diagram of the antenna device 217.

FIG. 25(A) is an exploded perspective view of the booster antenna 130 included in the antenna device 217, and FIG. 25(B) is an equivalent circuit diagram thereof. FIG. 25(C) is an equivalent circuit diagram of the antenna device 217. As illustrated in FIG. 25(A), the booster antenna 130 includes a base sheet 30, a first coil conductor 31, and a second coil conductor 32. Each of the coil conductor 31 and the coil conductor 32 is patterned so as to have a rectangular spiral shape. The winding direction of the coil conductor 31 and that of the coil conductor 32 are opposite (the same when seen through from one direction), and both are coupled through an electromagnetic field. In FIG. 25(B), an inductor L31 is the one in which an inductance produced by the coil conductor 31 is indicated by a symbol, an inductor L32 is the one in which an inductance produced by the coil conductor 32 is indicated by a symbol, and each of capacitors C1 and C2 is the one in which a capacitance occurring between the coil conductors 31 and 32 is indicated by a symbol of a lumped constant.

As described above, the two coil conductors 31 and 32 of the booster antenna 130 are wound and arranged such that an induced current flowing through the coil conductor 31 and that through the coil conductor 32 propagate in the same direction, and the coil conductors 31 and 32 are coupled through the capacitances. This booster antenna has the inductances of the coil conductors themselves and the capacitances resulting from capacitive coupling of the coil conductors, and the inductances and capacitances form a resonant circuit. It is preferable that the resonant frequency of that resonant circuit substantially correspond to the carrier frequency used in communication. This enables an increase in the communication distance.

In FIG. 25(C), an inductor L21 is the one in which an inductance produced by the coil conductor of the coil antenna 100 is indicated by a symbol, and a capacitor CIC is the one in which a capacitance associated with the coil conductor of the coil antenna 100, such as a parasitic capacitance of a radio-frequency integrated circuit (RFIC), is indicated by a symbol. The inductor L21 is coupled to the inductors L31 and L32 through an electromagnetic field. LC resonance occurs between the inductor L21 and the capacitor CIC. This enables the RFIC to be coupled to the LC circuit resulting from the booster antenna 130 in an impedance matched state.

Figure 26A:
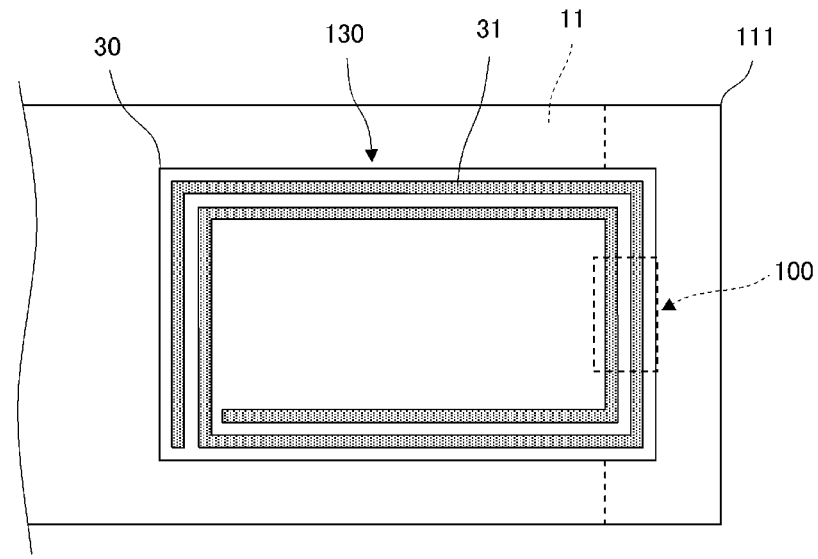
FIG. 26(A) is a plan view of the antenna device 217 and FIG. 26(B) is a cross-sectional view of a communication terminal apparatus including the antenna device 217.
Figure 26B:
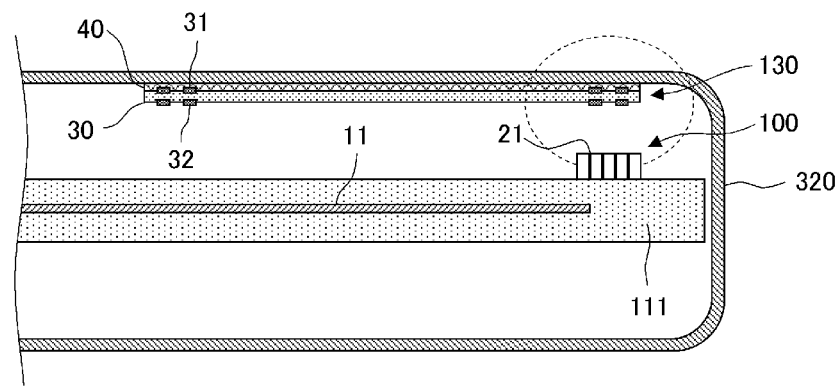

FIG. 26(A) is a plan view of the antenna device 217 and FIG. 26(B) is a cross-sectional view of a communication terminal apparatus including the antenna device 217.

The coil antenna 100 is mounted on the main substrate (printed wiring board) 111 in the terminal housing 320 as a surface-mount component. The booster antenna 130 is attached to the inner wall of the terminal housing 320 with an adhesive layer 40 disposed therebetween.

The coil antenna 100 functions as a feed coil. The coil antenna 100 and the booster antenna 130 are coupled through a magnetic field. More strictly, because a magnetic flux occurring in the planar conductor 11 (magnetic flux occurring in the direction of the arrow B illustrated in FIG. 15(A)) links the coil conductors 31 and 32 of the booster antenna 130, the booster antenna 130 is also coupled to the planar conductor 11 through a magnetic field. That is, the three elements of the coil antenna 100, the planar conductor 11, and the booster antenna 130 are coupled through a magnetic field. As a result, a magnetic field component that is a loss is small, and the antenna device with a reduced loss can be achieved.

It is preferable that the direction in which the conductive pattern of each of the coil conductors 31 and 32 of the booster antenna 130 extends and the direction in which the coil conductor 21 of the coil antenna 100 extends be parallel to each other and that the coil conductor 21 of the coil antenna 100 overlap the coil conductors 31 and 32 of the booster antenna 130 in plan view. That is, it is preferable that the winding axis of each of the coil conductors 31 and 32 of the booster antenna 130 be substantially orthogonal to the winding axis of the coil antenna 100. In this case, as indicated by the broken line illustrated in FIG. 26(B), a magnetic flux links the coil conductor 21 of the coil antenna 100 and the coil conductors 31 and 32 of the booster antenna 130. Because the coil conductor 21 of the coil antenna 100 and a part of the coil conductors 31 and 32 of the booster antenna 130 extend in substantially the same direction, they are also coupled through an electric field. That is, the coil antenna 100 is directly coupled to the booster antenna 130 through an electromagnetic field.

As described above, it is preferable that the antenna device (communication terminal apparatus) further include the booster antenna 130. When the booster antenna 130 is arranged on a side near to the antenna at the other end in communication, the maximum distance at which communication can be carried out for the antenna device can be further extended. When a communication signal is in the HF range, because the coil antenna 100 and the booster antenna 130 are coupled mainly through a magnetic field, it is not necessary to use mechanical connection means, such as a contact pin or a flexible cable.

The shape of the coil conductor of the booster antenna is not limited to a spiral; it may be a loop shape.

18th Embodiment

Figure 27A:
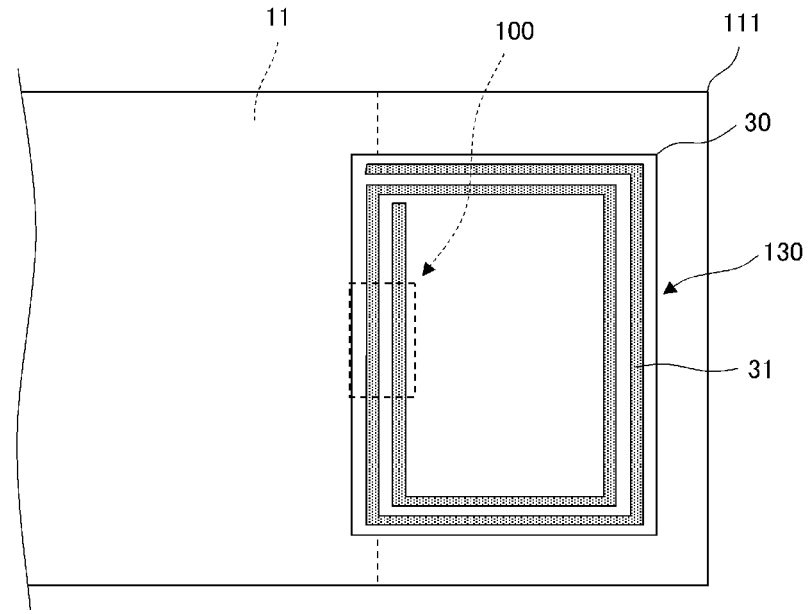
FIG. 27(A) is a plan view of an antenna device 218 according to an 18th embodiment and FIG. 27(B) is a cross-sectional view of a communication terminal apparatus including the antenna device 218.
Figure 27B:
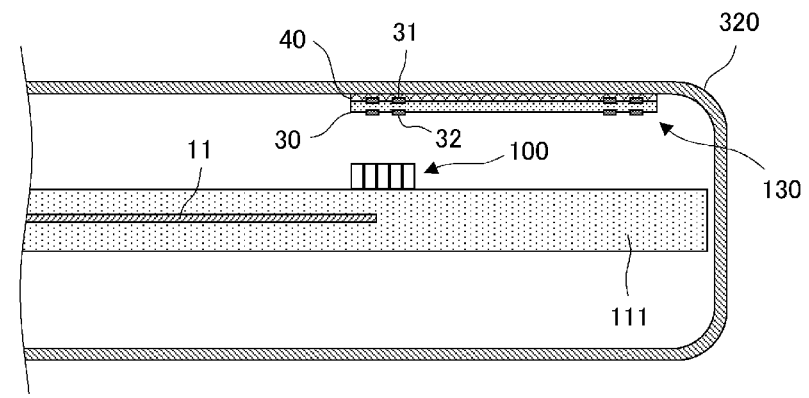

FIG. 27(A) is a plan view of an antenna device 218 according to an 18th embodiment and FIG. 27(B) is a cross-sectional view of a communication terminal apparatus including the antenna device 218. In the antenna device 218, the booster antenna 130 is arranged such that its coil opening is situated outside the end portion of the planar conductor 11. The other configuration is the same as that illustrated in the 17th embodiment.

Also when such a positional relationship is used, a magnetic flux occurring in the planar conductor 11 (magnetic flux occurring in the direction of the arrow B illustrated in FIG. 15(A)) links the coil conductors 31 and 32 of the booster antenna 130. The direct coupling between the coil antenna 100 and the booster antenna 130 is substantially the same as in the antenna device 217 in the 17th embodiment.

19th Embodiment

Figure 28:
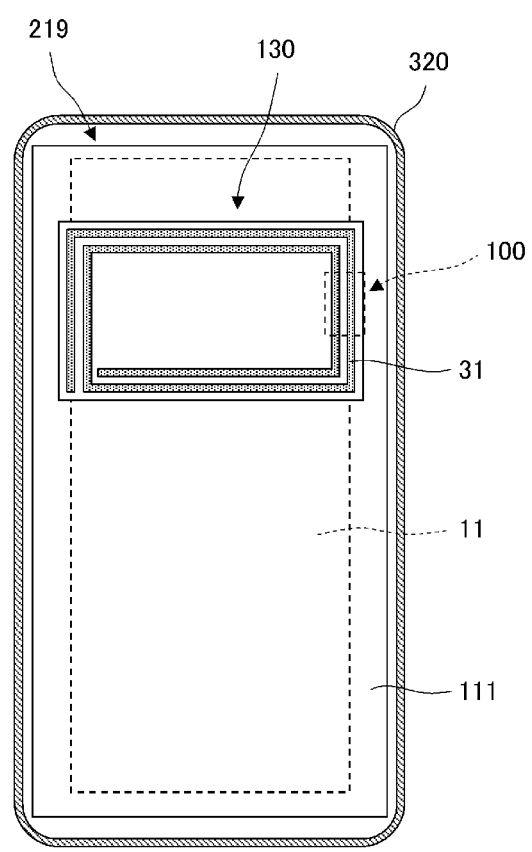
FIG. 28 is a plan view that illustrates a communication terminal apparatus including an antenna device 219 according to a 19th embodiment in a state where the upper housing is detached.

FIG. 28 is a plan view that illustrates a communication terminal apparatus including an antenna device 219 according to a 19th embodiment in a state where the upper housing is detached. In this example, the planar conductor 11 is a ground conductor disposed on the main substrate 111. The configuration of the coil antenna 100 is the same as that illustrated in the first embodiment. The configuration of the booster antenna 130 is the same as that illustrated in the 17th embodiment.

The planar conductor 11 constitutes a large proportion of the terminal housing 320 in terms of the plane. The coil antenna 100 is arranged such that the coil openings are positioned along the long sides of the planar conductor. As described above, when the planar conductor 11 has the shape of a rectangle having the long sides and short sides, it is preferable that the coil antenna 100 be arranged such that a coil opening faces a part of the long side. That is, when communication is carried out in the state where a magnetic flux is input and output in a central portion of the planar conductor 11, the magnetic field (magnetic flux) tends to flow toward the long sides, which have a shorter distance from the center of the planar conductor 11. Accordingly, the arrangement in which a coil opening of the coil antenna 100 faces the long side of the planar conductor 11 enables more stable communication.

20th Embodiment

Figure 29A:
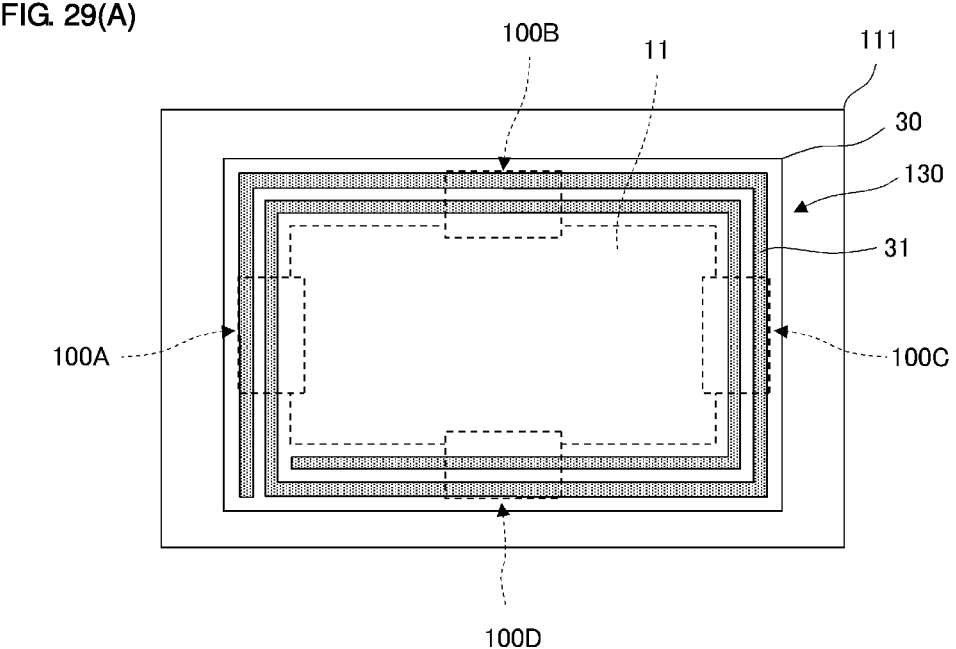
FIG. 29(A) is a plan view of an antenna device 220 and FIG. 29(B) is a cross-sectional view of the antenna device 220.
Figure 29B:
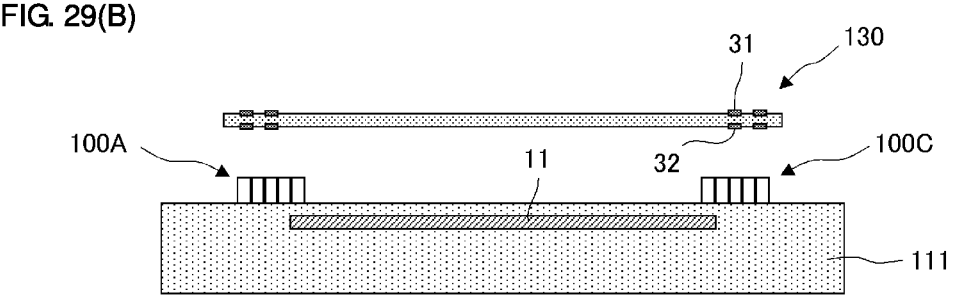

FIG. 29(A) is a plan view of an antenna device 220 and FIG. 29(B) is a cross-sectional view of the antenna device 220. The antenna device 220 includes the four coil antennas 100A, 100B, 100C, and 100D. These coil antennas 100A, 100B, 100C, and 100D are mounted on the main substrate (printed wiring board) 111 in the terminal housing as a surface-mount component. The booster antenna 130 can be attached to the inner wall of the housing, for example. The configuration of the booster antenna 130 is illustrated in the 17th embodiment.

The coil antennas 100A, 100B, 100C, and 100D are disposed on the respective sides of the rectangular planar conductor 11 and arranged so as to surround the planar conductor 11. The coil conductors of the coil antennas 100A, 100B, 100C, and 100D are connected in series in a direction in which electromotive force is accumulated and connected to a single feed circuit. The path of a magnetic flux flowing through the coil antennas 100A, 100B, 100C, and 100D and the planar conductor 11 is the same as that illustrated in FIG. 5(B). The connection relation among the coil conductors of the coil antennas 100A, 100B, 100C, and 100D is the same as that illustrated in FIG. 5(A).

As described above, the use of the plurality of coil antennas easily enables a necessary inductance. The arrangement in which the plurality of coil antennas 100A, 100B, 100C, and 100D are disposed around the planar conductor 11 strengthens the coupling between the plurality of coil antennas and the booster antenna 130, enhances the efficiency of the booster antenna 130, and reduces a loss. The advantageous effects produced by the use of the single planar conductor and the plurality of coil antennas, as illustrated in the first embodiment, are also obtainable.

Other Embodiments

The specific embodiments of the present invention are described above. The present invention is not limited to these above-described embodiments. For example, an element other than a coil antenna, such as a semiconductor element or a chip capacitor, may be mounted. The planar conductor may be a ground electrode on a wiring substrate, or alternatively, may be a metal that sheathes a battery pack. That is, the planar conductor is not limited to a dedicated planar conductor. Other metal body in part (or in whole) may be used as the planar conductor in an antenna device.

The magnetic core of the coil antenna may be a ceramic body, such as a ferrite ceramic body, or alternatively, may be a resin layer that contains ferrite powder distributed in a resin. The coil antenna, in which the coil conductor is wound around the surface of the magnetic core, may be overlaid with an insulating layer with the aim of, for example, protecting the coil conductor and protecting the magnetic core. The coil conductor may be one in which metal wire is wound around the magnetic core. When the magnetic core is a ferrite ceramic, the coil conductor may be a metal sintered body, such as one made of silver, simultaneously sintered with the ferrite ceramic. In the coil antenna, in which the coil conductor is wound around the magnetic core, the coil conductor may not be formed on the top surface of the magnetic core; the coil conductor in part or in whole may be disposed inside the magnetic core.

The antenna device in the terminal housing may be arranged in the vicinity of the front side (on the side on which a display unit and an input operation unit are disposed) of the terminal housing, or alternatively, may be disposed above the battery pack. The coil antenna may preferably be arranged on a side adjacent to an object at the other end in communication with respect to the planar conductor. Alternatively, the surface on which the coil antenna is arranged may be on a side opposite to an object at the other end in communication with respect to the planar conductor. In particular, when the coil conductor includes a portion that overlaps the planar conductor and another portion that does not overlap the planar conductor and also when the planar conductor is sufficiently thin, even if the coil antenna is arranged on a side opposite to an object at the other end in communication with respect to the planar conductor, it is sufficiently possible for this antenna device to carry out communication with the antenna device at the other end in communication.

The antenna device may be arranged as the sub substrate in the housing in the communication terminal apparatus, or alternatively, may be arranged on the main substrate. Alternatively, the antenna device may be embedded in a card module that can be inserted into the communication terminal apparatus. The antenna device is not limited to uses in a communication system in the HF range. The antenna device may be used as an antenna device used in other frequency ranges, including the ultrahigh frequency (UHF) range and the superhigh frequency (SHF) range, and may also be used in communication systems other than an RFID system. When the antenna device is used in an RFID system, it may be used as an antenna device in a reader/writer or may also be used as an antenna device in an RFID tag.

The antenna device of the present invention can be used in an RFID system in the HF range, for example. The communication terminal apparatus of the present invention is useful as a communication terminal apparatus that includes an RFID system in the HF range, for example.

REFERENCE SIGNS LIST

BS back surface
CA connection area
FC feed circuit
FE leading end
HP proximal portion
L1 to L4 coil
SL slit
W1 to W8 connection wiring
10 base
10a, 10b, 10c base layer
11 planar conductor
11A first planar conductor region
11B second planar conductor region
12a, 12b input/output terminal
20 magnetic core
20a, 20c, 20b, 20d magnetic layer
21 coil conductor
21a, 21b, 21c conductive pattern
21V via conductor
22a, 22b input/output-terminal connection electrode
23 coupling electrode
23a, 23b coupling-electrode connection electrode
24 coupling electrode
30 base sheet
31 first coil conductor
32 second coil conductor
40 adhesive layer
100 coil antenna
100A first coil antenna
100B second coil antenna
100C third coil antenna
100D fourth coil antenna
106 chip coil antenna
111 main substrate
112 battery pack
113 chip coil antenna
113A, 113B coil antenna
114 chip coil antenna
130 booster antenna
201 to 207 antenna device
208A, 208B antenna device
209A, 209B antenna device
210 to 220 antenna device
301, 310, 315, 316 communication terminal apparatus
320 terminal housing
400 coil antenna at the other end in communication

The invention claimed is:

1. An antenna device comprising:
a planar base;
a first planar conductor disposed in the planar base;
a second planar conductor disposed in the planar base, such that the second planar conductor is adjacent to the first planar conductor in a plan view of the planar base; and
a coil antenna that includes a coil conductor wound along a winding axis and a magnetic body disposed at least inside a winding region of the coil conductor,
wherein the coil antenna includes first and second coil openings in the winding axis of the coil conductor that are disposed adjacent to respective edge portions of the first and second planar conductors, respectively,
wherein each of the first and second planar conductors includes a portion that does not overlap with the winding region of the coil conductor in a direction normal to the planar base,
wherein the winding axis of the coil conductor extends in a direction parallel to planar surfaces of the first and second planar conductors, and
wherein at least one of the first and second planar conductors is insulated from direct contact with the coil conductor.

2. The antenna device according to claim 1, wherein at least a portion of first and second end portions of the coil conductor overlap the first and second planar conductors, respectively, in a direction normal to the planar base.

3. The antenna device according to claim 1, wherein the planar base is a printed wiring board.

4. The antenna device according to claim 1, wherein both of the first and second planar conductors are insulated in terms of direct contact with the coil conductor.

5. The antenna device according to claim 1, wherein both of the first and second planar conductors are insulated from the coil conductor.

6. The antenna device according to claim 1, wherein both of the first and second planar conductors are disposed within the planar base, such that the first and second planar conductors do not contact a surface of the planar base.

7. An antenna device comprising:
a planar base;
a first planar conductor disposed in the planar base;
a second planar conductor disposed in the planar base, such that the second planar conductor is adjacent to the first planar conductor in a plan view of the planar base; and
a coil antenna that includes a coil conductor wound along a winding axis and a magnetic body disposed at least inside a winding region of the coil conductor,
wherein the coil antenna includes first and second coil openings in the winding axis of the coil conductor that are disposed adjacent to respective edge portions of the first and second planar conductors, respectively,
wherein each of the first and second planar conductors includes a portion that does not overlap with the winding region of the coil conductor in a direction normal to the planar base,
wherein the winding axis of the coil conductor extends in a direction parallel to planar surfaces of the first and second planar conductors, and
wherein the antenna device is a high frequency (HF) band device.

8. The antenna device according to claim 7, wherein at least a portion of first and second end portions of the coil conductor overlap the first and second planar conductors, respectively, in a direction normal to the planar base.

9. The antenna device according to claim 7, wherein the planar base is a printed wiring board.

10. The antenna device according to claim 7, wherein at least one of the first and second planar conductors is insulated in terms of direct contact with the coil conductor.

11. The antenna device according to claim 10, wherein both of the first and second planar conductors are insulated in terms of direct contact with the coil conductor.

12. The antenna device according to claim 7, wherein both of the first and second planar conductors are insulated from the coil conductor.

13. The antenna device according to claim 7, wherein both of the first and second planar conductors are disposed within the planar base, such that the first and second planar conductors do not contact a surface of the planar base.

* * * * *